(12) United States Patent
Dickerson et al.

(10) Patent No.: US 12,269,509 B1
(45) Date of Patent: Apr. 8, 2025

(54) REMOTE VEHICLE GUIDANCE

(71) Applicant: Zoox, Inc., Foster City, CA (US)

(72) Inventors: Matthew Nathaniel Dickerson, San Francisco, CA (US); Oliver Fielding Douglas, San Francisco, CA (US); Ravi Gogna, San Jose, CA (US); Collin MacGregor, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 340 days.

(21) Appl. No.: 17/710,602

(22) Filed: Mar. 31, 2022

(51) Int. Cl.
    *B60W 60/00*       (2020.01)
(52) U.S. Cl.
    CPC ..... *B60W 60/0015* (2020.02); *B60W 2520/04* (2013.01); *B60W 2520/06* (2013.01); *B60W 2520/10* (2013.01); *B60W 2520/105* (2013.01); *B60W 2552/30* (2020.02); *B60W 2556/45* (2020.02); *B60W 2720/10* (2013.01)
(58) Field of Classification Search
    CPC ......... B60W 60/0015; B60W 2556/45; B60W 2552/30
    See application file for complete search history.

(56) References Cited

U.S. PATENT DOCUMENTS

| | | | | |
|---|---|---|---|---|
| 2016/0148513 | A1* | 5/2016 | Beaurepaire | G08G 1/164 701/117 |
| 2017/0192423 | A1* | 7/2017 | Rust | G05D 1/0027 |
| 2018/0356814 | A1* | 12/2018 | Brooks | G05D 1/0027 |
| 2020/0062267 | A1* | 2/2020 | Magzimof | B60W 50/082 |
| 2020/0239023 | A1* | 7/2020 | Srinivasan | G05D 1/228 |
| 2020/0310417 | A1* | 10/2020 | Pedersen | G05D 1/0061 |
| 2020/0379457 | A1* | 12/2020 | Ostafew | G05D 1/0061 |
| 2020/0409368 | A1* | 12/2020 | Caldwell | G05D 1/0044 |
| 2023/0166771 | A1* | 6/2023 | Fernandez-Moral | G05D 1/2279 701/2 |
| 2023/0194286 | A1* | 6/2023 | Winter | G01C 21/3407 |
| 2024/0300501 | A1* | 9/2024 | Rathour | B60W 50/023 |

* cited by examiner

*Primary Examiner* — Jaime Figueroa
*Assistant Examiner* — Jerrod Irvin Davis
(74) *Attorney, Agent, or Firm* — Lee & Hayes, P.C.

(57) ABSTRACT

Techniques for providing remote guidance to a vehicle operating in an environment, by an operator located in the environment, are described herein. The operator can include a safety observer configured to observe one or more vehicles operating in the environment and may identify a scenario that requires a modification to a vehicle operation (e.g., stop forward movement, change direction of travel, modify a maximum speed, etc.). The operator may access a graphical user interface (GUI) via an operator computing device, and may input a constraint to modify the vehicle operation. The vehicle computing system may receive a control signal including the constraint, and may modify a vehicle trajectory based on the constraint. The vehicle computing system may later determine that a condition associated with the constraint is satisfied, and may continue vehicular operation in absence of the constraint.

20 Claims, 7 Drawing Sheets

REMOTE VEHICLE GUIDANCE

BACKGROUND

Vehicles operate in dynamic environments in which conditions often change. Among the changing conditions are road blockages due to construction, accidents, and the like. Autonomous vehicles may be programmed to react to the changing conditions, while maintaining the vehicle within a designated operations protocol. In some instances, reactions to changing conditions may be trained, such as based on historical data associated with operations of vehicles in a particular area. However, when operating in a new area, the historical data may not be available, and reactions to changing and/or unknown conditions may be delayed. To ensure safe operation of an autonomous vehicle, a safety driver may be present in the autonomous vehicle, such as to intercede in the event that a condition may arise that warrants human input. However, including a well-rested and trained safety driver in every autonomous vehicle in a fleet of vehicles can be difficult to staff. Additionally, it can be difficult for the safety driver to maintain an alert posture after hours of operation sitting in a vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
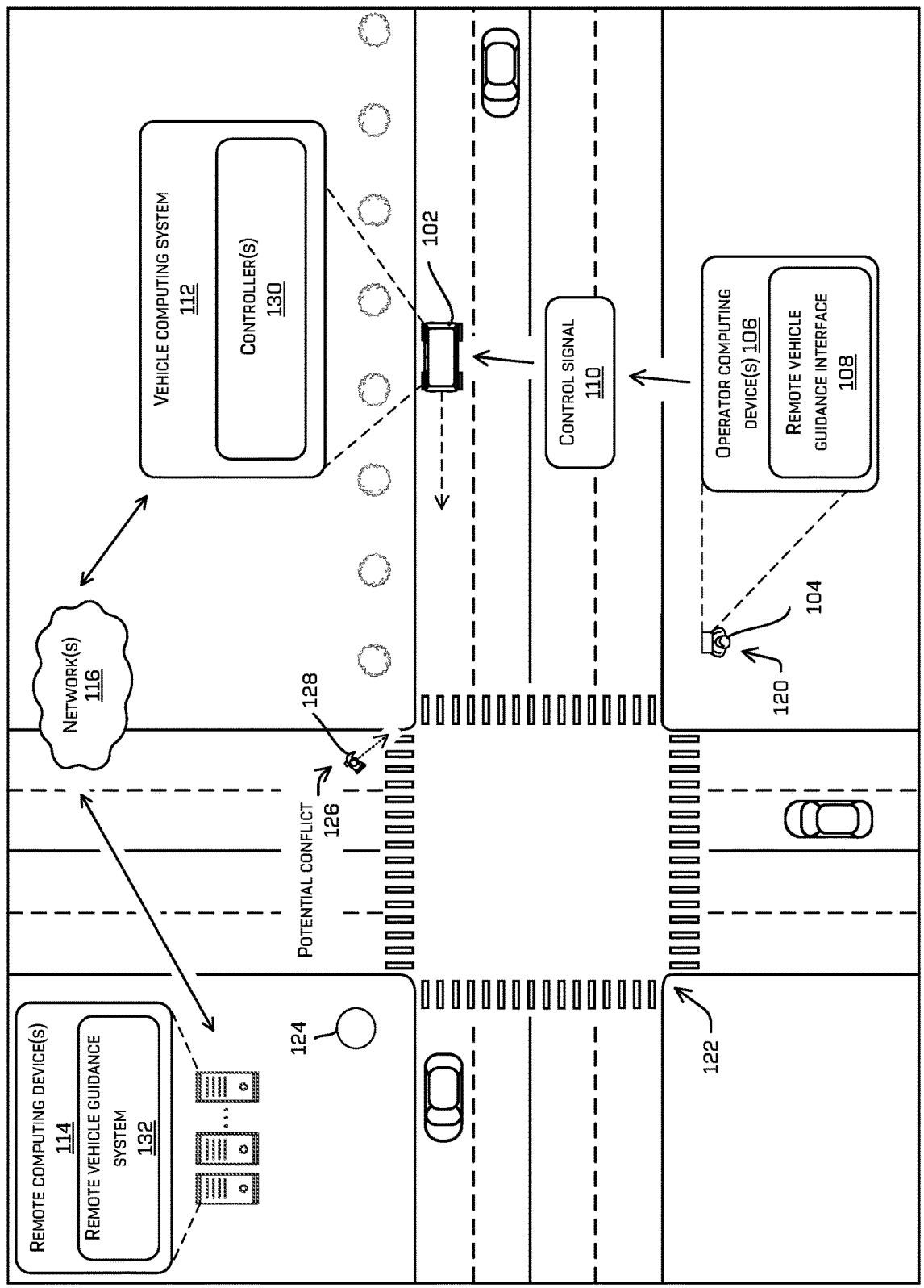
FIG. 1 is an illustration of an autonomous vehicle in an environment, which may be configured to receive control signals from one or more remote computing devices while operating in the environment.

This disclosure is directed to techniques for providing guidance to a vehicle operating in an environment. In some examples, the guidance may be provided by an operator located in the environment accessing and/or providing input to an operator computing device that is remote from, but communicatively coupled to, the vehicle. For instance, the operator can include a safety observer configured to observe one or more vehicles operating in the environment, such as to verify a safe operation thereof. The vehicle may include an autonomous vehicle with a vehicle computing system that is configured perform functions of localization, navigation, and control, such as to operate the vehicle through the environment. In at least one example, the operator (e.g., safety observer) may identify a scenario that requires a modification to a vehicle operation (e.g., stop forward movement, change direction of travel, modify a maximum speed, etc.). The operator may access a graphical user interface (GUI) associated with the operator computing device (e.g., tablet, laptop, phone, or other mobile device), and may input a constraint to modify the vehicle operation. The vehicle computing system may receive a control signal including the constraint, and may modify a vehicle trajectory based on the constraint. Accordingly, the techniques described herein improve the overall safe operation of vehicular operation in an environment.

In some examples, the environment may include an area and/or region that is unfamiliar to the vehicle computing system. In such examples, one or more operators may be dispatched to the environment to observe vehicular operation of one or more vehicles in the unfamiliar environment, such as to maximize safe operation of the vehicle(s). In some examples, one or more operator(s) may be dispatched to an unfamiliar environment based at least in part on a determination that one or more operating conditions associated with the environment have not been satisfied. Non-limiting examples of the operating condition(s) include a number of miles traveled, a number of hours operating, a number of disparate scenarios safely navigated, a maximum and/or average number of dynamic objects operating in the environment with the vehicle(s), and/or the like. In some examples, the operating condition can be associated with a single vehicle and/or a fleet of two or more vehicles configured to communicate between one another and/or with a central computing system configured to process data associated with vehicular operation of the fleet. In such examples, the central computing system may be configured to determine whether the operating condition(s) are satisfied, and if not, deploy one or more operators to the environment. The operator computing device may be a portion of, or communicatively coupled to, such a central computing system when present.

In at least one example, the operator may have associated therewith a mobile computing device (referred to herein as an "operator computing device") that is remote from the vehicle computing system, but may be communicatively coupled thereto. In some examples, the operator computing device and the vehicle computing system may share a network identifier. That is, the operator computing device may be communicatively coupled via a same, private network. In some examples, the operator computing device may include a device identifier that is authorized to communicate with the vehicle computing system. In at least one example, the vehicle computing system may be configured to validate the operator computing device prior to receiving a control signal therefrom, to prevent malicious actors from sending errant control signals thereto.

In various examples, the operator computing device may be configured to directly couple to the vehicle computing system automatically (e.g., without user input) when located in proximity to a vehicle associated with the vehicle computing system. In some examples, the proximity may be determined based on the operator computing device being within a threshold distance (e.g., one mile, two kilometers, 3 city blocks, etc.) of the vehicle computing system. In some examples, the threshold distance may be associated with a line of sight distance in the environment. In some examples, the threshold distance may be associated with a threshold signal strength associated with a network signal and/or connection between the operator computing device and the vehicle computing system. That is, when the vehicle operating in the environment travels within the threshold distance of the operator computing device (or vice versa) and/or the signal strength is sufficient, the devices may communicatively couple and may thus be configured for control signal transmission. In some examples, the operator can identify a particular vehicle of one or more vehicles operating in the environment and/or within the threshold distance with which to couple. In at least one example, the operator may input, via a GUI on the operator computing device, a selection of the particular vehicle. For example, the GUI may include a moving map displaying the one or more vehicles operating in the environment. The operator may select, on the moving map, a particular vehicle with which to couple. Based on the input, the operator computing device may send a connection request to the vehicle computing system, such as to establish a connection between the two devices.

In various examples, the vehicle computing system may receive a connection request from the operator computing device. In some examples, the connection request may include an identifier associated with the operator computing device. The identifier may include a device identifier, a network identifier, an operator identifier (e.g., employee number, etc.) and/or other types of identifiers associated with the operator, the operator computing device and/or the vehicle computing system. In at least one example, the identifier may be associated with verifying authenticity of the connection request and/or validating the requesting device as an authorized operator and/or operator computing device. Based on a determination that the identifier is not recognized and/or is invalid, the vehicle computing system may deny the connection request, thereby precluding receipt and/or processing of control signals from the requesting operator computing device.

Based on a determination that the identifier is recognized and/or valid, the vehicle computing system may communicatively couple to the operator computing device. In various examples, in response to establishing a connection with the operator computing device, the vehicle computing system may be configured to receive one or more control signals therefrom. In at least one example, a control signal may include one or more constraints associated with vehicular operation. Non-limiting examples of constraints include limitations on a duration and/or distance of continued operation of the vehicle, a maximum speed, a maximum and/or minimum acceleration, a direction of travel, a maximum or minimum radius of turn, a direction of turn, a mission type (e.g., with passengers, without passengers, return to base, etc.), an operating avoidance area (e.g., keep-out zone, constraint to not operate on a particular street, in a particular lane (e.g., closed road, closed lane, etc.), in designated area, zone, or location to avoid (e.g., due to construction, etc.)), and/or the like. For example, an operator may identify an occluded dynamic object (e.g., object out of view of the sensors of the vehicle) in an environment of the vehicle that may potentially conflict with the vehicle. The operator may input a constraint via the GUI to stop continued movement of the vehicle based on the occluded dynamic object, such as to avoid the potential conflict. For another example, the operator may identify a static object that is located in or near a path of the vehicle, but may not be detected by vehicle sensors and/or included in map data. The operator may input a constraint via the GUI to modify a trajectory of the vehicle to avoid the static object.

In various examples, the vehicle computing system may receive the control signal and may control the vehicle based at least in part on the constraint. In at least one example, the vehicle computing system may control the vehicle based on the constraint utilizing techniques such as those described in U.S. patent application Ser. No. 17/489,083, filed Sep. 29, 2021 and entitled "Vehicle Operating Constraints," the entire contents of which are incorporated herein by reference for all purposes. Continuing the example from above, the vehicle computing system receives the control signal and slows the vehicle to a stop, thereby avoiding a collision with the occluded dynamic object. In some examples, the vehicle computing system may be configured to process the control signal while operating in an autonomous mode of operation and control the vehicle according to the constraint. That is, the vehicle computing system may be configured to perform localization, navigation, and control of the vehicle to autonomously operate through the environment and may incorporate the constraint into the vehicular operation. In some examples, the vehicle computing system may be configured to process the control signal while operating in a semi-autonomous or manual mode. In such examples, the vehicle computing system may process the control signal and control the vehicle based on the constraint, potentially overriding manual input (e.g., control inputs, constraints, etc.) from an operator of the vehicle.

In various examples, the vehicle computing system may be configured to determine whether a condition associated with the constraint received from the operator computing device is satisfied. In some examples, a determination that the condition is satisfied may be based on a determination that the vehicle is operating based on the constraint. Continuing the example from above in which the control signal includes an instruction to stop movement, the vehicle computing system may determine that the condition associated with the constraint is satisfied by determining that the vehicle speed is substantially zero (e.g., within a threshold speed (e.g., 0.1 kilometers per hour 0.2 miles per hour, etc.) of zero). For another example, a constraint may include a limitation on a maximum speed. Based on a determination that a speed of the vehicle is at or below the maximum speed, the vehicle computing system may determine that the condition associated with the constraint is satisfied.

In some examples, a determination that the condition associated with the constraint is satisfied may be based on a determination that the control signal has been released and/or that a release signal has been received from the operator computing device. Continuing the example from above, the operator may determine that the occluded dynamic object is located in view of one or more sensors of the vehicle such that the vehicle computing system can detect and safely operate the vehicle around the object. Based on a determination that the occluded dynamic object is in view of the vehicle (e.g., vehicle computing system receives sensor data indicative of the object), the operator may cease sending the control signal (e.g., release the control signal, cease sending an instruction to control the vehicle based on the constraint, etc.). In response to identifying an absence of the control signal and/or the constraint, the vehicle computing system may determine that the condition associated with the constraint is satisfied. Additionally or alternatively, a determination that the condition is satisfied may be based at least in part on determining that the vehicle is no longer in range of the operator computing device (e.g., distance between the vehicle and the operator computing device meets or exceeds a threshold distance, signal strength of a connection between the vehicle computing system and the operator computing device is equal to or less than a threshold signal strength, the vehicle is out of line of sight range of the operator computing device, etc.).

In some examples, in response to determining that the condition associated with the constraint is satisfied, the vehicle computing system may control the vehicle at the exclusion of the constraint. That is, the vehicle computing system may cease applying the constraint in vehicle control considerations and may continue normal operation of the vehicle. In examples in which the vehicle is operating in autonomous mode, the vehicle computing system may autonomously control the vehicle based at least in part on sensor data (e.g., data associated with cameras, motion detectors, lidar, radar, time of flight, etc.) and/or map data of the environment. In examples in which the vehicle is operating in a semi-autonomous mode or manual mode, the vehicle computing system may release (e.g., remove, cease to apply, clear, etc.) the constraint and provide an indication thereof to the operator of the vehicle, such as via a display in the vehicle. Based on the mode of operation and/or previously determined settings (e.g., vehicle operator input), the vehicle computing system may control the vehicle and/or release the vehicle for manual operation in absence of the constraint.

In various examples, the vehicle computing system may request guidance from a different (second) remote operator, such as a teleoperator, configured to provide remote guidance to the vehicle via a remote vehicle guidance system, such as that described in U.S. patent application Ser. No. 16/457,646, filed Jun. 28, 2019, and entitled "Remote Vehicle Guidance," the entire contents of which are incorporated herein by reference for all purposes. In at least one example, the vehicle computing system may send a guidance request to the remote vehicle guidance system, the guidance request including sensor data (e.g., processed sensor data and/or raw sensor data) from one or more sensors on the vehicle and a request to verify continued operations of the vehicle in the environment. The remote vehicle guidance system may be configured to process the sensor data from the vehicle computing system and/or one or more other sensors in the environment (e.g., sensor(s) on other vehicles, sensor(s) mounted in the environment, etc.), and cause a presentation of a real-time or near real-time representation of the environment to the second operator. In at least one example, the remote vehicle guidance system can include a remote guidance GUI configured to receive input from the second operator, such as to provide navigation and/or control instructions to the vehicle computing system.

In some examples, in response to receiving the guidance request (e.g., a request to verify continued operations), the second operator may evaluate the representation of the environment based on the sensor data (e.g., from the vehicle and/or other sensors in the environment) and may determine whether continued operations are verified. That is, the second operator may determine whether the vehicle can continue in the environment without the constraint on vehicular operation. In various examples, the remote computing system may be configured to evaluate the representation of the environment, such as to determine whether continued operations are verified. In such examples, the remote computing system may be configured to provide guidance to the vehicle computing system without input from the second operator.

Based on a determination that the constraint remains relevant to vehicular operation, the remote vehicle guidance system may send an instruction to the vehicle computing system to continue to control the vehicle according to the constraint. Based on a determination that the constraint is no longer relevant and/or that the vehicle computing system can operate autonomously in the environment without the constraint, the remote vehicle guidance system may send the vehicle computing system a release signal. The release signal may be input by the second operator and/or generated by the remote vehicle guidance system (e.g., without input from the second operator), and may include an instruction to control the vehicle at the exclusion of the constraint (e.g., remove, release, clear the constraint from vehicle control considerations). In some examples, the remote vehicle guidance system may generate the release signal, which may subsequently be delivered to the vehicle computing system after verification or validation from the second operator. That is, the remote vehicle guidance system may request confirmation of the release signal from the second operator, such as via the remote GUI, prior to sending the release signal to the vehicle computing system.

In various examples, in response to receiving the release signal, the vehicle computing system may remove the constraint from vehicle control considerations. That is, the vehicle computing system may release the constraint such that the vehicle can be controlled at the exclusion of the constraint (e.g., without limiting operation based on the constraint). In at least one example, such as when operating in the autonomous mode and/or the semi-autonomous mode, the vehicle computing system may process sensor data and control the vehicle through the environment based on the sensor data. In examples in which the vehicle is operating in a manual mode, the vehicle computing system may cause a presentation of a notification to the vehicle operator, to inform the operator that the constraint has been removed. In some examples, the notification may include an indication that the vehicle may be operated without the previously applied constraint.

In some examples, the vehicle computing system may process data associated with the constraint and use the data to train one or more machine learning models associated with a planner component of the vehicle computing system. That is, the vehicle computing system may process the data to learn more about the environment, such as to enable the vehicle(s) to anticipate potential conflicts in the environment and control the vehicle appropriately. For example, the vehicle computing system may process data associated with the occluded dynamic object discussed above, and may train the machine learning model(s) to determine a probability of an object being located in an occluded region in the environment. Based on the probability and/or other factors, the vehicle computing system may determine to, while operating in an autonomous or semi-autonomous mode, limit a maximum speed proximate the occluded region, such as to anticipate a potential conflict. Additionally or alternatively, based on the probability and/or other factors, the vehicle computing system may cause a warning or alert to be displayed and/or emitted to an operator of the vehicle, such as to warn the operator of a potential conflict. In at least one example, the vehicle computing system may send the data to one or more remote computing devices that are configured to train data models and/or update software associated with one or more vehicle computing systems associated with a fleet of vehicle(s). In such an example, the remote computing device(s) may train the machine learning models and/or update software associated with the vehicle computing system(s) based on the data, and may provide updated models and/or updated software to the vehicle computing system.

The techniques described herein may increase the safety of operation of the autonomous vehicle through a new and/or unfamiliar environment. For example, a safety observer located in the environment may provide guidance to the vehicle computing system, to limit operation of the vehicle based on an observed condition in the environment (e.g., unplanned speed limitation, unplanned inability to turn at an intersection, occluded object that may potentially conflict with the vehicle, etc.). Based on the guidance (e.g., control signal including a constraint) received from the safety observer, and to maximize the safe operation of the vehicle, the vehicle computing system may limit vehicular operation. After a condition associated with a constraint is satisfied, the vehicle computing system may be released to continue normal operation in the environment. That is, once the condition in the environment is no longer present and/or does not constitute a potential conflict, the vehicle may continue operations. Accordingly, the techniques described herein increase safe operation of the vehicle, while also minimizing an impact on the vehicle traveling to the destination, such as by enabling an efficient means by which an applied constraint may be released to allow the vehicle to travel to a destination.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) operating in an environment 100 nearby a first operator 104 (e.g., safety observer). In at least one example, the first operator 104 may operate an operator computing device 106 that includes a remote vehicle guidance interface 108 (interface 108) configured to receive input from the first operator 104 and send a control signal 110 to a vehicle computing system 112 associated with the vehicle 102 based on the input.

The operator computing device 106 can include any type of mobile device (e.g., mobile telephone, tablet, laptop, etc.) configured to communicate with one or more other computing devices (e.g., vehicle computing system 112, remote computing devices 114, etc.) via one or more networks 116. The network(s) 116 may include public networks such as the internet, private networks such as an institutional and/or personal network or some combination of public and private networks. The network(s) 116 may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), radio networks (e.g., radio frequency(ies) configured for control signal transmission), or any combination thereof. That is, the network(s) 116 may be configured to facilitate communications between devices located in and/or remote from the environment 100.

In at least one example, the network 116 connecting the operator computing device 106 and the vehicle computing system 112 may be a first network (e.g., radio frequency) configured for control signal 110 transmission and the network 116 connecting the vehicle computing system 112 to the remote computing device(s) 114 may include a second network 116 (e.g., Wi-Fi) that is different from the first network. In at least one example, the first network connecting the operator computing device 106 and the vehicle computing system 112 may include a private network, such as a private radio frequency or range of frequencies designated for control signal transmission. In various examples, the first network connecting the operator computing device 106 and the vehicle computing system 112 may be encrypted and/or may have associated therewith an authentication code (e.g., tone code, director identification number, network identifier, etc.) that enables authentication of the requesting device.

In at least one example, the first operator 104 may be dispatched to the environment 100 to observe vehicular operation of one or more vehicles 102 in the environment 100, such as to verify safe operation of the vehicle(s) 102 within the environment 100. In some examples, the first operator 104 may be dispatched to the environment 100 to be a safety observer for a recovery operation of a vehicle 102. For example, if the vehicle 102 has a maintenance issue and needs to be transported with a recovery vehicle (e.g., tow truck, flat bed, etc.), the first operator 104 may be dispatched to the vehicle 102 to be a safety observer, such as to pause or modify vehicular behavior during the recovery. In some examples, the environment 100 may include an area and/or region that is unfamiliar to the vehicle computing system 112. In such examples, the first operator 104 may be dispatched to the environment 100 based on a determination that one or more operating conditions associated with the environment 100 have not been satisfied. Non-limiting examples of the operating condition(s) include a number of miles traveled, a number of hours operating, a number of disparate scenarios safely navigated, a maximum and/or average number of dynamic objects (e.g., object 128) operating in the environment 100, and/or the like.

In at least one example, the remote computing device(s) 114 may determine that the operating condition(s) have not been satisfied and may cause the first operator 104 to be dispatched to the environment 100. For example, the remote computing device(s) 114 may send a message to the operator computing device 106 instructing the first operator 104 to dispatch to the environment. In at least one example, the remote computing device(s) 114 may include computing devices that are configured to provide information to one or more vehicle computing systems 112 associated with one or more vehicles 102 operating in the environment 100. That is, the remote computing device(s) 114 may be configured as a central hub configured to manage a fleet of one or more vehicles operating in the environment 100. As will be discussed below, the remote computing device(s) 114 may be configured to, in some examples, provide remote guidance to the vehicle 102.

In at least one example, the remote computing device(s) 114 may configured to identify a location 120 for the first operator 104 to be dispatched (e.g., operate) and/or may be configured as the conduit via which the location 120 may be communicated to the operator 104 (e.g., a manager inputs the location 120, which is subsequently sent via the remote computing device(s) 114 to the operator computing device 106). In some examples, the location 120 can include a particular geographic location (e.g., latitude/longitude, address, etc.) and/or an area (e.g., a particular block on a side of the road, at a particular corner of an intersection 122, in view of an alleyway, etc.). In some examples, the location 120 can include the geographic location and a surrounding area (e.g., within 5, 10 meters or feet of the geographic location). In at least one example, the remote computing device(s) 114 may cause two or more operators, such as the first operator 104, to be dispatched to the environment 100 at different locations, to ensure the vehicle(s) operate safely.

In some examples, the first operator 104 may be dispatched to the location 120 based on a determination that a modification to a driving surface in the proximate the location 120 has occurred. A modification to the driving surface can include any change to lane routing, lanes and/or streets available for vehicular travel (closed lanes, closed roads, etc.), and/or the like. For example, the modification to the driving surface may be due to a construction zone, an event (e.g., roads and/or lanes closed for runners, cyclists, concerts, etc.), and/or any other scenario that affects road travel.

In some examples, the remote computing device(s) 114 may determine the modification to the driving surface, and thus may cause the first operator 104 to be dispatched to the associated location 120, based on input received from a human or other remote source. In some examples, the human may be associated with the vehicular operation, such as a remote operator or other person configured to provide information and/or updates to the vehicle computing system 112. In some examples, the human may be unassociated with the vehicular operation, but may be configured to provide information that is relevant to a fleet of vehicles. For example, a city roads manager may send the remote computing device(s) 114 an indication that certain roads and/or portions thereof in the environment 100 will be closed for an event. Based on the indication, the remote computing device(s) 114 may determine the modification to the driving surface and may send an instruction to the first operator 104, via an associated operator computing device 106, to cause the first operator 104 to be dispatched to the location 120. In some examples, the remote computing device(s) 114 may determine the modification to the driving surface based on sensor data received from one or more vehicles 102 operating in the environment 100 and/or one or more sensors 124 mounted and/or located in the environment 100. The sensor data can include raw sensor data and/or processed sensor data. Non-limiting examples of sensor data include image data from cameras, lidar data, radar data, time of flight data, location data (e.g., GPS coordinates, cellular triangulation data, etc.), inertial data (e.g., from motion detectors, inertial measurement units, gyroscopes, etc.), and/or the like. For example, the remote computing device(s) 114 may receive sensor data from the vehicle(s) 102 and/or the sensor(s) 124 and may determine that orange cones are being placed proximate the location 120 in the environment 100, signifying a set-up of a construction zone. Based on an identification of the construction zone, the remote computing device(s) 114 may cause the first operator 104 to be dispatched to the location 120.

In some examples, the remote computing device(s) 114 may be configured to transmit authentication information to the operator computing device 106 and/or the vehicle computing system 112, such as to enable the vehicle computing system 112 to authenticate the operator computing device 106 upon receipt of a connection request. In some examples, the authentication information may include a code, token, network identifier, or other data that can be used to authenticate a requesting device. For example, the remote computing device(s) 114 may push and/or otherwise load authentication information to the operator computing device 106, the authentication information including a network identifier associated with a private network designated for control signal transmission. The operator computing device 106 may store the authentication information received from the remote computing device(s) 114 and may subsequently include the authentication information in a connection request.

In at least one example, the first operator 104 may observe a scenario in the environment 100 that could involve a potential conflict 126 with the vehicle 102. The potential conflict 126 may include any situation in which the vehicle 102 may need to modify a vehicle trajectory, such as to avoid an accident and/or a near miss. In the illustrative example, the potential conflict 126 includes an object 128 that is currently occluded (e.g., blocked from view) from the sensors of the vehicle and traveling on a trajectory that, if unchanged, could result in the object 128 crossing in front of the vehicle 102. For another example, the potential conflict 126 may include an observation of increased pedestrian activity, which may or may not be erratic, proximate an intersection 122. The first operator 104 may determine that, based in part on the number of pedestrians and the manner in which they are acting and/or interacting, that one or more of the pedestrians may move onto a drivable surface in front of the vehicle 102, and thus that the scenario constitutes a potential conflict 126. For yet another example, the potential conflict 126 may include the proximity of children to a drivable surface on which the vehicle 102 is operating or proximity of the vehicle 102 to a marked or unmarked school zone, playground, and/or the like.

In various examples, in response to determining the potential conflict 126, the first operator 104 may access the interface 108 on the operator computing device 106 and input a constraint on operation of the vehicle 102, such as to avoid an accident and/or near miss associated with the potential conflict 126. In some examples, prior to or concurrently with the first operator 104 inputting the constraint associated with a particular vehicle 102, the operator computing device 106 and the vehicle computing system 112 may establish a connection for communication. In at least one example, prior to dispatch of the vehicle 102 and/or first operator 104 in the environment 100, the vehicle computing system 112 and the operator computing device 106 may pair or otherwise verify a communication coupling between devices.

In some examples, the vehicle computing system 112 and the operator computing device 106 may be configured to disconnect and re-establish a connection one or more times during vehicular operation in the environment 100. In some examples, the vehicle computing system 112 may be configured to connect with two or more operator computing devices 106 while operating in the environment 100. In some examples, the operator computing device 106 and/or the vehicle computing system 112 may initiate a connection session (e.g., the connection for communications) based on a determination, by one or both devices, that the vehicle 102 is located in proximity the location 120 (e.g., within a threshold distance of (e.g., 0.5 kilometers, 0.25 miles, 2 blocks, etc.), a line of sight distance in the environment, within a threshold signal strength distance, etc.). That is, the operator computing device 106 and the vehicle computing system 112 may be configured to automatically establish a connection for communication without input from the first operator 104, based on a distance and/or signal strength between devices.

In some examples, the operator computing device 106 and the vehicle computing system 112 may establish a connection based on a connection request, such as that initiated by the first operator 104 and/or the operator computing device 106. In some examples, the operator computing device 106 may send the connection request to the vehicle computing system 112 in response to receiving an indication of selection of the associated vehicle 102, such as via the interface 108. In at least one example, the interface 108 may include a moving map representative of real-time and/or near real-time locations of vehicles 102 operating in the environment 100. In some examples, the moving map may represent vehicle(s) 102 operating in proximity to the location 120 (e.g., within the threshold distance, threshold signal strength, line of sight distance, etc.). In such examples, the moving map may represent vehicles eligible to establish a connection and/or receive control signals 110 from the first operator 104.

In some examples, the connection request may include an identifier associated with the operator computing device 106, such as a device identifier, a network identifier, operator identifier, and/or the like. In some examples, the operator computing device 106 and the vehicle computing system 112 may be configured with a same network identifier and may establish the connection based on the network identifier, such as that associated with a network of the network(s) 116. In at least one example, the network identifier may represent a private network accessible to vehicle computing system(s) associated with the fleet of vehicle(s) (or portion thereof) and operator computing device(s) and/or operator(s) authorized to communicate therewith (e.g., previously paired thereto). In such an example, the vehicle computing system can ensure connections with authorized devices, such as to prevent malicious attempts to communicate with the vehicle computing system 112 and/or control the vehicle 102.

In some examples, the vehicle computing system 112 may be configured to validate the connection request based on the identifier associated with the requesting device (e.g., operator computing device 106). In some examples, the identifier may include a device identifier or operator identifier configured to uniquely identify the operator computing device 106 from other devices and/or the operator 104 from other individuals. In various examples, the vehicle computing system 112 may have stored thereon a database including identifiers associated with authorized devices and/or authorized operators. In such examples the vehicle computing system 112 may receive the connection request including the identifier, and may validate the request based on a determination that the identifier is stored in the database in association with the authorized device(s) and/or operator(s).

In response to determining that the operator computing device 106 is an authorized device and/or establishing a connection therewith, the vehicle computing system 112 may receive the control signal 110 from the operator computing device 106. As discussed above, in response to observing the potential conflict 126, the first operator 104 may input the constraint (e.g., one or more constraints) on operation of the vehicle 102, such as via the interface 108. Non-limiting examples of constraints include limitations on continued operation of the vehicle (e.g., instruction to stop movement, instruction to pull-over out of a flow of traffic, etc.), a decreased speed (e.g., 10 kilometers per hour, 10 miles per hour less than a current operating speed, etc.), a decreased maximum speed, a maximum and/or minimum acceleration, a direction of travel, a maximum or minimum radius of turn, a direction of turn, a mission type (e.g., with passengers, without passengers, return to base, etc.), an operating avoidance area (e.g., keep-out zone, constraint to not operate on a particular street, in a particular lane (e.g., closed road, closed lane, etc.), in designated area, zone, or location to avoid (e.g., due to construction, etc.), and/or the like. In the illustrative example, the first operator 104 identifies the potential conflict 126 with the object 128, and inputs a constraint for the vehicle to decrease a maximum forward speed, to provide the vehicle 102 time to process data associated with the occluded object 128 and perform appropriate actions (e.g., yield to the object 128, continue on a vehicle trajectory based on a determination that the object 128 stopped at the intersection 122, etc.) when the object 128 comes into view of the sensors of the vehicle 102.

In at least one example, the operator computing device 106 may receive the input (including the constraint) and may generate and send a control signal 110 including the constraint to the vehicle computing system 112. As discussed above, the operator computing device 106 may send the control signal 110 to the connected vehicle computing system 112 and/or the vehicle computing system 112 associated with the vehicle 102 that is selected by the first operator 104 to receive the constraint, such as a selection input via the interface 108. In various examples, the vehicle computing system 112 may receive the control signal 110 and one or more controllers 130 of the vehicle computing system 112 may control the vehicle 102 based at least in part on the constraint. In at least one example, the controller(s) 130 may control the vehicle based on the constraint utilizing techniques such as those described in U.S. patent application Ser. No. 17/489,083, the entire contents of which are incorporated herein by reference above. In some examples, a primary controller of the vehicle computing system 112 may be configured to receive the control signal 110 and process the constraint, such as to control the vehicle based on the constraint. In some examples, the primary controller may include a controller that is separate from, but communicatively coupled to, a planner component of the vehicle computing system (e.g., planning component 724), the planner component being configured to determine trajectories for the vehicle 102 to follow, among other functions. In at least one example, the primary controller may be configured with a highest level safety rating associated with autonomous vehicles (e.g., automotive safety integrity level (ASIL) rating D). In some examples, the control signal 110 may be received and processed by a component (e.g., primary controller) with the highest level safety rating, while bypassing one or more components with lower safety ratings (e.g., ASIL rating C, etc.). For example, the primary controller may receive and process the control signal and/or constraint associated therewith, which may bypass a lower rated planner component of the vehicle computing system 112.

In some examples, the primary controller may receive the constraint data from a separate component configured to receive and process the control signal 110. In such examples, the vehicle computing system 112 may include a component configured to communicate with and process control signals from the operator computing device 106 and to provide the constraints to the primary controller for vehicular control. Continuing the example from above, the vehicle computing system receives the control signal 110 and the controller(s) 130 slow the vehicle 102 to a speed that is equal to or less than the reduced maximum speed associated with the constraint, thereby enabling the vehicle computing system 112 and/or an operator located in the vehicle 102 additional time to detect and avoid the object 128.

In some examples, the vehicle computing system 112 may be configured to process the control signal 110 while operating in an autonomous mode of operation and control the vehicle 102 according to the constraint. That is, the vehicle computing system 112 may be configured to perform localization, navigation, and control of the vehicle to autonomously operate through the environment 100 and may incorporate the constraint into the vehicular operation. In some examples, the vehicle computing system 112 may be configured to process the control signal 110 while operating in a semi-autonomous or manual mode. In such examples, the vehicle computing system 112 may process the control signal and control the vehicle 102 based on the constraint, potentially overriding manual input (e.g., control inputs, constraints, etc.) from an operator of the vehicle. In some examples, the vehicle computing system 112 may cause presentation, via a display in the vehicle 102, of a warning or alert to the operator of the vehicle 102, informing the operator about the object 128 and/or providing an explanation for the decreased speed. For example, the vehicle computing system 112 may receive a control signal 110 while operating in the manual mode or the semi-autonomous mode, the control signal 110 including a constraint to reduce a forward speed of the vehicle 102 by a particular amount (e.g., 15 kilometers per hour) based on an observed animal running proximate the intersection 122. The vehicle computing system 112 may apply the constraint and control the vehicle 102 based on the constraint and may cause a presentation of an alert about the animal proximate the intersection.

In at least one example, an explanation or reasoning associated with the constraint (e.g., occluded object, animal observed proximate a path of the vehicle 102, etc.) may be input by the first operator 104 via the interface 108, and provided to the vehicle computing system 112 and/or the remote computing device(s) 114. In some examples, the vehicle computing system 112 may be configured to process the explanation or reasoning and cause presentation thereof to the vehicle operator on the display in the vehicle 102, such as if the vehicle 102 is operating in a manual or semi-autonomous mode. In some examples, the vehicle computing system 112 and/or the remote computing device(s) 114 may process the explanation or reasoning and/or other data associated with the constraint (e.g., type of constraint, value associated with the constraint, etc.) and may store the data in a datastore.

In some examples, the vehicle computing system 112 and/or the remote computing device(s) 114 may utilize the data associated with the constraint (e.g., explanation or reasoning, constraint data, etc.) to train one or more machine learning models associated with a planner component of the vehicle computing system 112. That is, the vehicle computing system 112 and/or remote computing device(s) 114 may process the data to learn more about the environment 100, such as to enable the vehicle computing system 112 to anticipate potential future conflicts in the environment 100 and control the vehicle 102 appropriately. For example, the vehicle computing system 112 may process data associated with the object 128 discussed above, and may train the machine learning model(s) to determine a probability of an object being located in an occluded region in the environment 100. Based on the probability and/or other factors, the vehicle computing system 112 may determine to limit a maximum speed proximate the occluded region, such as to anticipate a potential future conflict, such as potential conflict 126. Additionally or alternatively, based on the probability and/or other factors, the vehicle computing system 112 may cause a warning or alert to be displayed and/or emitted to an operator of the vehicle, such as to warn the operator of the probability of a potential conflict.

In various examples, in response to applying the constraint to vehicular operation, the vehicle computing system 112 may be configured to determine whether a condition associated with the constraint is satisfied. In some examples, a determination that the condition is satisfied may be based on a determination that the vehicle 102 is operating based on the constraint. For example, a constraint may include a limitation on continued movement of the vehicle 102. Based on a determination that the controller(s) 130 have caused the vehicle 102 to stop forward movement (e.g., vehicle speed is within a threshold speed (e.g., 0.3 kilometers per hour 0.1 miles per hour, etc.) of zero), the vehicle computing system 112 may determine that the condition associated with the constraint is satisfied. In some examples, the determination that the constraint is satisfied may be based on a determination that a time period, maximum distance, or other factor associated with the constraint has expired. For example, the vehicle computing system may be programmed to apply the constraint for a period of time (e.g., 1 minute, 5 minutes, etc.), such as if no release signal is received. After determining that a current time meets or exceeds the period of time without receiving a release signal, the vehicle computing system may determine that the condition is satisfied.

In some examples, a determination that the condition associated with the constraint is satisfied may be based on a determination that a fault associated with the constraint included in the control signal 110 is resolved. In such examples, the vehicle computing system 112 may determine that the fault that resulted in the constraint is no longer applicable, the condition is satisfied, and may clear the constraint to continue operations in absence of the constraint. For example, the operator may observe a fault with the vehicle 102, and may apply the constraint on vehicular behavior based on the fault. Based on a determination that the fault is resolved, the vehicle computing system 112 may determine that the condition is satisfied.

In some examples, a determination that the condition associated with the constraint is satisfied may be based on a determination that the control signal 110 has been released and/or that a release signal has been received from the operator computing device 106. For example, the first operator 104 may determine that the object 128 has moved into view of one or more sensors of the vehicle 102 such that the vehicle computing system 112 can detect and safely operate the vehicle 102 around the object 128. Based on a determination that the object 128 is in view of the vehicle 102 (e.g., vehicle computing system 112 can receive sensor data indicative of the object 128), the first operator 104 may cease sending the control signal 110 (e.g., release the control signal 110, cease sending an instruction to control the vehicle 102 based on the constraint, etc.). In response to identifying an absence of the control signal 110 and/or the constraint, the vehicle computing system 112 may determine that the condition associated with the constraint is satisfied. In some examples, the first operator 104 may input, via the interface 108, a release signal including an instruction to remove data associated with the constraint (withhold data associated with the constraint) from vehicle control considerations. In such examples, the vehicle computing system 112 may be determined based on receipt of the release signal, that the condition associated with the constraint is satisfied.

Additionally or alternatively, a determination that the condition is satisfied may be based at least in part on determining that the vehicle 102 is no longer in range of the operator computing device (e.g., distance between the vehicle 102 and the operator computing device 106 meets or exceeds a threshold distance, signal strength of a connection between the vehicle computing system 112 and the operator computing device 106 is equal to or less than a threshold signal strength, the vehicle 102 is out of line of sight range of the operator computing device 106, etc.).

In some examples, in response to determining that the condition associated with the constraint is satisfied, the vehicle computing system 112 may control the vehicle 102 at the exclusion of the constraint (e.g., based on a removal of the constraint). That is, the vehicle computing system 112 may cease applying the constraint in vehicle control considerations and may continue normal operation of the vehicle 102. In examples in which the vehicle 102 is operating in autonomous mode, the vehicle computing system 112 may autonomously control the vehicle 102 based at least in part on sensor data and/or map data of the environment 100. In examples in which the vehicle 102 is operating in the semi-autonomous or manual mode, the vehicle computing system 112 may release (e.g., remove, cease to apply, clear, etc.) the constraint and provide an indication thereof to the operator of the vehicle 102, such as via the display in the vehicle 102. Based on the mode of operation and/or previously determined settings (e.g., vehicle operator input), the vehicle computing system 112 may control the vehicle 102 and/or release the vehicle 102 for manual operation in absence of the constraint.

In various examples, the vehicle computing system 112 may request guidance from a remote (second) operator, such as a teleoperator, associated with the remote computing device(s) 114. In at least one example, the remote computing device(s) 114 may be configured to enable the remote operator to provide remote guidance to the vehicle computing system 112 via a remote vehicle guidance system 132, such as that described in U.S. patent application Ser. No. 16/457,646, the entire contents of which are incorporated herein by reference above. In at least one example, the vehicle computing system 112 may send a guidance request to the remote computing device(s) 114, the guidance request including sensor data (e.g., processed sensor data and/or raw sensor data) from one or more sensors on the vehicle and a request to verify continued operations of the vehicle in the environment. The remote vehicle guidance system 132 may be configured to process the sensor data from the vehicle computing system 112 and/or one or more other sensors in the environment 100 (e.g., sensor(s) 124, sensor(s) on other vehicles, etc.), and cause a presentation of a real-time or near real-time representation of the environment to the second operator. In at least one example, the remote vehicle guidance system 132 can include a remote guidance GUI configured to receive input from the second operator, such as to provide navigation and/or control instructions to the vehicle computing system 112.

In some examples, in response to receiving the guidance request (e.g., a request to verify continued operations), the second operator may evaluate the representation of the environment 100 based on the sensor data (e.g., from the vehicle and/or other sensors in the environment) and may determine whether continued operations without the constraint are authorized (e.g., verification that operations without the constraint can be safely performed). That is, the second operator may determine whether the vehicle 102 can continue in the environment 100 without the constraint on vehicular operation. In various examples, the remote vehicle guidance system 132 may be configured to evaluate the representation of the environment 100, such as to determine whether continued operations are authorized. In such examples, the remote vehicle guidance system 132 may be configured to provide guidance to the vehicle computing system 112 without input from the second operator.

Based on a determination that the constraint remains relevant to vehicular operation, the remote vehicle guidance system 132 may send an instruction to the vehicle computing system 112 to continue to control the vehicle 102 according to the constraint. Based on a determination that the constraint is no longer relevant and/or that the vehicle computing system 112 can operate autonomously in the environment 100 without the constraint, the remote vehicle guidance system 132 may send the vehicle computing system 112 a release signal. The release signal may be input by the second operator and/or generated by the remote vehicle guidance system 132 (e.g., without input from the second operator), and may include an instruction to control the vehicle 102 at the exclusion of the constraint (e.g., remove, release, clear the constraint from vehicle control considerations). In some examples, the remote vehicle guidance system 132 may generate the release signal, which may subsequently be delivered to the vehicle computing system 112 after verification or validation from the second operator. That is, the remote vehicle guidance system 132 may request confirmation of the release signal from the second operator, such as via the remote GUI, prior to sending the release signal to the vehicle computing system 112.

In various examples, in response to receiving the release signal, the vehicle computing system 112 may remove the constraint from vehicle control considerations. That is, the vehicle computing system 112 may release the constraint such that the vehicle 102 can be controlled at the exclusion of the constraint (e.g., without limiting operation based on the constraint). In at least one example, such as when operating in the autonomous mode and/or the semi-autonomous mode, the vehicle computing system 112 may process sensor data and control the vehicle 102 through the environment 100 based at least in part on the sensor data. In examples in which the vehicle 102 is operating in a manual mode, the vehicle computing system 112 may cause a presentation of a notification to the vehicle operator (via the display), to inform the operator that the constraint has been removed. In some examples, the notification may include an indication that the vehicle 102 may be operated without the previously applied constraint.

Figure 2:
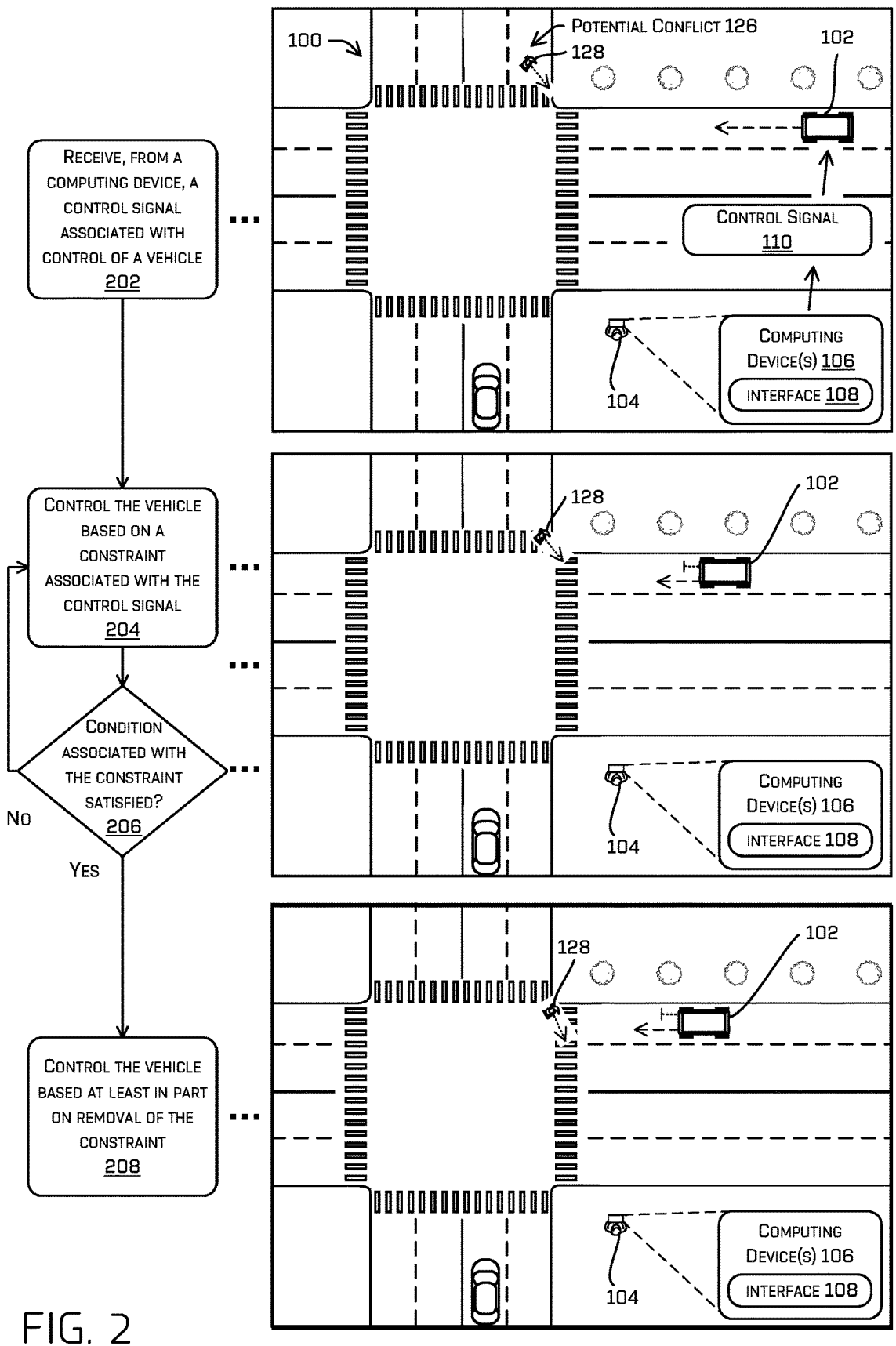
FIG. 2 depicts an example process for controlling a vehicle in response to a control signal received from a remote computing device.

FIG. 2 depicts an example process 200 for controlling a vehicle 102 in response to a control signal 110, received from an operator computing device 106 (illustrated as operator computing device 106) associated with an operator 104 located in an environment 100 of the vehicle. In at least one example, the operator 104 may include a safety observer located in and/or dispatched to the environment 100, such as to observe and/or monitor operations of one or more vehicles 102 of a fleet of vehicles operating in the environment 100, such as to ensure the safe operation thereof.

As discussed above, one or more remote computing devices, such as remote computing device(s) 114, and/or a manager or other employee associated with vehicular operations and/or managing safety observers may determine to dispatch the operator 104 to the environment 100. In some examples, the operator 104 may include a contractor, employee, or other trusted person associated with the environment 100 (e.g., lives in, works in, frequents, etc.). In such examples, the operator 104 may be hired to observe operations of the vehicle(s) 102 when they are in the environment 100. For example, the operator 104 may live in the environment 100 and may sign up to operate as a safety observer when at home and/or when in the neighborhood.

In various examples, when observing vehicular operations, the operator 104 may access an interface 108, such as to identify vehicle(s) 102 proximate a location of the operator 104, and to input constraints, when appropriate. In at least one example, the operator 104 may input validation credentials associated with the computing device 106 and/or the interface 108, such as to verify an authorization to monitor vehicular operation via the operator computing device 106 and/or input constraints via the interface 108. In response to receiving valid credentials, the operator computing device 106 may provide the operator 104 access to the interface 108.

As discussed above, the operator 104 may observe a scenario in the environment 100 that could involve a potential conflict 126 with the vehicle 102. The potential conflict 126 may include any situation in which the vehicle 102 may need to modify a vehicle trajectory, such as to avoid an accident and/or a near miss. In the illustrative example, the potential conflict 126 includes an object 128 that is currently occluded (e.g., blocked from view) from the sensors of the vehicle and traveling on a trajectory that, if unchanged, could result in the object 128 crossing in front of the vehicle 102. For another example, the potential conflict 126 may include an observation of increased pedestrian activity, which may or may not be erratic, proximate an intersection 122. The first operator 104 may determine that, based in part on the number of pedestrians and the manner in which they are acting and/or interacting, that one or more of the pedestrians may move onto a drivable surface in front of the vehicle 102, and thus that the scenario constitutes a potential conflict 126.

In various examples, in response to determining the potential conflict 126 associated with the vehicle 102, the operator 104 may select the vehicle 102 to receive the control signal 110. In some examples, the operator 104 may select the vehicle 102 via the interface 108, such as, for example, in a moving map representing one or more vehicles in the environment 100. In some examples, the operator 104 and/or the operator computing device 106 may select the vehicle to receive the control signal 110 based on a determination that the vehicle 102 is closer to a location associated with the operator (e.g., location 120) than any other vehicles in the environment 100. That is, the operator 104 and/or the operator computing device 106 may select the closest vehicle 102 to the operator computing device 106 to receive the control signal 110. For example, the operator computing device 106 may automatically (e.g., without operator 104 input) select the vehicle 102 based on a determination that the distance between the vehicle 102 and the operator computing device 106 is within a threshold distance and/or is less than another distance between another vehicle and the operator computing device 106. For another example, the operator computing device 106 may automatically connect to the vehicle computing system 112 based on a determination that a signal strength of a network signal between the vehicle computing system 112 and the operator computing device 106 meets or exceeds a threshold signal strength.

In various examples, based on an indication of selection of the vehicle 102, the operator computing device 106 may determine whether the operator computing device 106 is communicatively connected to the vehicle computing system (e.g., vehicle computing system 112). Based on a determination that a connection session has not yet been established, in some examples, the operator computing device 106 may send a connection request to the vehicle computing system to establish a connection therewith. As discussed above, the connection request may include an identifier, such as a network identifier, a device identifier, an operator identifier, and/or the like, configured to enable the vehicle computing system to verify the operator computing device 106 as an authorized device for communications.

Based on a determination that the operator computing device 106 and the vehicle computing system are currently connected (e.g., connection session established), the vehicle computing system, at operation 202, receives the control signal 110 from the operator computing device 106. In various examples, the operator computing device 106, generates and sends the control signal 110 in response to receiving the input of the constraint from the operator 104, such as in response to observing the potential conflict 126. Non-limiting examples of constraints include limitations on continued operation of the vehicle (e.g., instruction to stop movement, instruction to pull over out of a flow of traffic, out of a lane, etc.), a decreased speed (e.g., 10 kilometers per hour, 10 miles per hour less than a current operating speed, etc.), a decreased maximum speed, a maximum and/or minimum acceleration, a direction of travel, a maximum or minimum radius of turn, a direction of turn, a mission type (e.g., with passengers, without passengers, return to base, etc.), an operating avoidance area (e.g., keep-out zone, constraint to not operate on a particular street, in a particular lane (e.g., closed road, closed lane, etc.), in designated area, zone, or location to avoid (e.g., due to construction, etc.), and/or the like. Though described herein as "a constraint" this is not intended to be so limiting, and it is understood that the control signal may include two or more constraints, such as an acceleration limitation and a speed limitation to apply to vehicular operation.

At operation 204, the vehicle computing system controls the vehicle 102 based on the constraint associated with the control signal 110. For example, a constraint may include a limitation on continued operations of the vehicle 102 (e.g., an instruction to stop movement). As such, the vehicle computing system may control the vehicle to a stopped location. For another example, the constraint may include a limitation on a maximum speed (e.g., slow to a maximum of 13 kilometers per hour, 7 miles per hour, etc.). In response to receiving the control signal comprising the constraint, the vehicle computing system may slow the vehicle speed to at or below the maximum speed associated with the constraint. In at least one example, the vehicle computing system controls the vehicle 102 based at least in part on the constraint, such as utilizing the techniques described in U.S. patent application Ser. No. 17/489,083, the entire contents of which are incorporated herein by reference above.

In examples in which the constraint is associated with slowing or stopping the vehicle 102, the vehicle computing system may determine a rate of negative acceleration (e.g., deceleration, deceleration rate) to apply to the slowing or stopping maneuver. In some examples, the deceleration rate may be a predetermined rate associated with receiving control signals from a remote source (e.g., remote operator, remote vehicle guidance system 132, etc.). In some examples, the vehicle computing system may determine the deceleration rate based on a difference between a current operating speed when the control signal 110 is received and a final speed associated with the constraint. In such examples, the vehicle computing system may apply a greater deceleration rate for higher speeds than that applied to slower speeds.

In some examples, the vehicle computing system may determine the deceleration rate based on the control signal 110 and/or data included therein. The data may include a type of constraint, an indication of an emergency action, and/or the like. For example, the control signal 110 may include an instruction to conduct an emergency stop. In such an example, the vehicle computing system may determine the deceleration rate based on the instruction to conduct the emergency stop.

At operation 206, the vehicle computing system determines whether a condition associated with the constraint is satisfied. In some examples, a determination that the condition is satisfied may be based on a determination that the vehicle 102 is operating based on the constraint. In some examples, a determination that the condition associated with the constraint is satisfied may be based on a determination that a fault associated with the constraint included in the control signal 110 is resolved. In some examples, the determination that the condition associated with the constraint is satisfied may be based on a determination that the control signal 110 has been released and/or that a release signal has been received from the operator computing device 106. For example, the operator 104 may cause the operator computing device 106 to stop sending the control signal 110, such as in response to a second input to cease sending the constraint and/or release the control signal 110. For another example, the operator may provide a second input via the interface 108 including an instruction to send a release signal, and based on the second input the operator computing device 106 may send the release signal to the vehicle computing system. The release signal may include an instruction to release the constraint and/or control the vehicle at the exclusion of the constraint.

Additionally or alternatively, a determination that the condition is satisfied may be based at least in part on determining that the vehicle 102 is no longer in range of the operator computing device (e.g., distance between the vehicle 102 and the operator computing device 106 meets or exceeds a threshold distance, signal strength of a connection between the vehicle computing system 112 and the operator computing device 106 is equal to or less than a threshold signal strength, the vehicle 102 is out of line of sight range of the operator computing device 106, etc.).

In some examples, the determination that the condition associated with the constraint is satisfied may be based on a determination that a release signal has been received from one or more remote computing devices (e.g., remote computing device(s) 114), such as those associated with a remote vehicle guidance system (e.g., remote vehicle guidance system 132). As discussed above, the vehicle computing system may request guidance from a remote vehicle guidance system. In some examples, a remote operator associated with the remote vehicle guidance system may receive the guidance request including a request to continue normal operation (e.g., operation without the constraint). In such examples, the remote operator may observe the environment 100, such as based on received sensor data, and may cause a release signal to be sent to the vehicle computing system. In some examples, the remote vehicle guidance system may be configured to automatically (e.g., without human input) evaluate conditions in the environment and send a release signal to the vehicle computing system, such as based on a determination that continued operations without the constraint are authorized (e.g., verified, determined to be safe, potential conflict no longer exists, etc.). In at least one example, the vehicle computing system may receive the release signal from the remote computing device(s) associated with the remote vehicle guidance system, and may determine that the condition associated with the constraint is satisfied.

Additionally or alternatively, the determination that the condition is satisfied may be based on a determination that a time period, maximum distance, maximum range, and/or the like associated with the constraint has expired. In some examples, the time period may include a maximum time period associated with the constraint. In such examples, the constraint may be applied to vehicle control considerations for the threshold period of time, in the absence of receiving a release signal. In some examples, the time period, maximum distance, maximum range, and/or the like may be determined based on the type of constraint and/or details about a scenario that resulted in the constraint being applied. For example, a first constraint applied to avoid another vehicle (e.g., car, truck, etc.) may be applied for a first time period and a second constraint applied to avoid a pedestrian may be applied for a second time period.

Based on a determination that the condition associated with the constraint is not satisfied ("No" at operation 206), the vehicle computing system may continue to control the vehicle based on the constraint, such as that described with respect to operation 204. Based on a determination that the condition associated with the constraint is satisfied ("Yes" at operation 206), the vehicle computing system, at operation 208, controls the vehicle based at least in part on removal of the constraint (e.g., at the exclusion of the constraint). That is, the vehicle computing system may cease applying the constraint in vehicle control considerations and may continue normal operation of the vehicle 102. In examples in which the vehicle 102 is operating in autonomous mode, the vehicle computing system may autonomously control the vehicle 102 based at least in part on sensor data and/or map data of the environment 100. In examples in which the vehicle 102 is operating in the semi-autonomous or manual mode, the vehicle computing system may release (e.g., remove, cease to apply, clear, etc.) the constraint and provide an indication thereof to the operator of the vehicle 102, such as via the display in the vehicle 102. Based on the mode of operation and/or previously determined settings (e.g., vehicle operator input), the vehicle computing system may control the vehicle 102 and/or release the vehicle 102 for manual operation in absence of the constraint.

Figure 3:
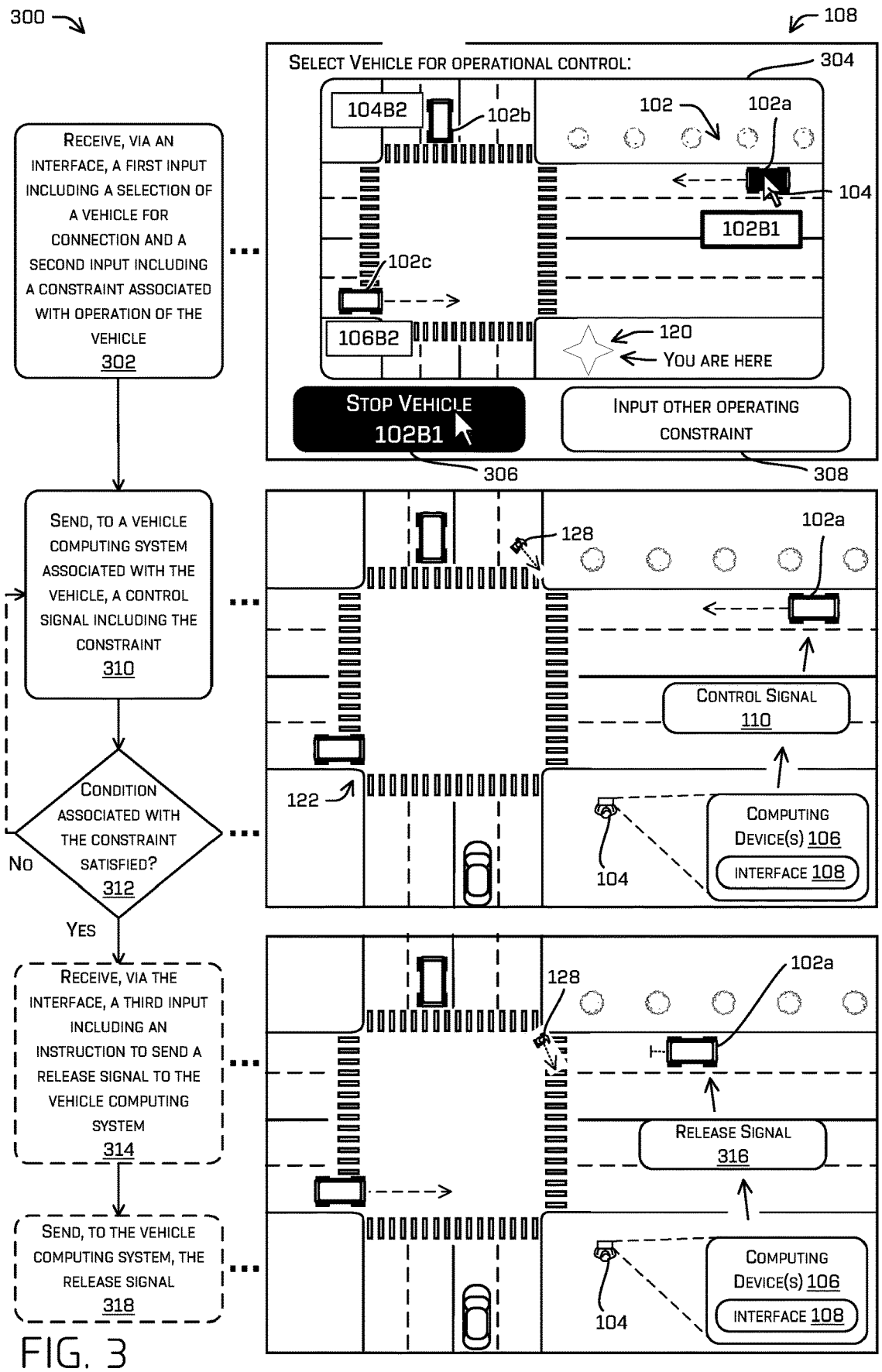
FIG. 3 depicts an example process for providing remote guidance to a vehicle.

FIG. 3 depicts an example process 300 for providing remote guidance to a vehicle 102 operating in an environment, such as environment 100. In at least one example, an operator 104 (illustrated as a cursor) in the environment may provide remote guidance to the vehicle 102, such as via an operator computing device 106.

At operation 302, the operator computing device 106 receives, via an interface 108, a first input including a selection of a vehicle 102a for connection and a second input including a constraint associated with operation of the selected vehicle 102a. In the illustrative example, the interface 108 includes a map 304 that includes representations of one or more vehicles 102 operating in the environment. In the illustrative example, the map 304 includes the selected vehicle 102a, a second vehicle 102b, and a third vehicle 102c. Though this is not intended to be so limiting, and the map 304 may include a greater or lesser number of vehicles 102 operating in the environment. In some examples, the map 304 may include a number of vehicles 102 operating within a threshold distance (e.g., 3 blocks, 0.6 miles, 2 kilometers, etc.) of a location 120 of the operator 104 and/or the operator computing device 106. In such examples, the map 304 may represent vehicles 102 connected to and/or eligible to establish a connection with and/or receive control signals from the operator computing device 106.

In at least one example, the map 304 may include a real-time and/or near real-time representation of locations of the vehicle(s) 102 operating in the environment. That is, the map 304 may include a moving map with representations of vehicle(s) as they are operating in the environment (e.g., moving, remaining stationary, etc.). In some examples, the map 304 may have associated therewith data corresponding to each of the depicted vehicles 102 and/or the movement thereof. Non-limiting examples of the data which may be presented include an identifier, operating details (e.g., trajectory, speed, direction of travel, acceleration, etc.), an indication of passengers in the vehicle 102, an indication of an operator in the vehicle 102, and/or the like. For example, as illustrated in FIG. 3, the data presented in association with the map 304 may include identifiers associated with each vehicle 102 and a direction of travel associated with each moving vehicle (e.g., arrow associated with vehicles 102a and 102c, no arrow (e.g., non-movement) associated with vehicle 102b), etc.).

In the illustrative example, the first input is depicted as selection of a representation of the vehicle 102a on the map 304. Additionally or alternatively, the vehicle(s) 102 may be represented as a collection (e.g., list) of vehicles available for connection. In some examples, the collection may be presented in order based on proximity to the operator computing device 106. In such examples, the operator computing device may monitor a distance between the location 120 and locations of each vehicle 102, such as to maintain an updated (e.g., in real-time or near real-time) collection of vehicle(s) 102. In some examples, the collection of vehicle(s) 102 and/or the vehicle(s) represented on the map 304 may include one or more vehicles 102 that share a network identifier with the operator computing device 106. In some examples, the collection of vehicle(s) 102 and/or the vehicle(s) represented on the map 304 may include vehicle(s) 102 that previously established a connection and/or paired with the operator computing device 106. That is, the collection and/or the vehicle(s) 102 represented on the map 304 may include vehicle(s) configured to connect and/or already connected to the operator computing device 106.

In the illustrative example, the second input includes a constraint associated with stopping movement of the vehicle 102a. For example, the second input includes a selection of a stop vehicle selectable control 306 of the interface 108. In other examples, and as described above, the constraint may include additional or alternative instructions, such as to slow the vehicle 102a to a stop at a particular rate (e.g., emergency stop), to operate the vehicle 102a at a reduced speed, to reduce a maximum speed and/or acceleration of the vehicle 102a, and/or the like. For example, the operator 104 may select an alternative action selectable control 308. In some examples, in response to receiving an indication of selection of the alternative action selectable control 308, the operator computing device may cause presentation of one or more controls associated with the additional or alternative instructions. Though illustrated as a single alternative action selectable control 308, this is not intended to be so limiting, and the interface 108 may include individual controls associated with inputting one or more available constraints that the operator 104 may send to the vehicle computing system.

At operation 310, the operator computing device 106 sends, to the vehicle computing system associated with the vehicle 102a, a control signal 110 including the constraint. In various examples, the operator computing device 106 may send the control signal 110 in response to receiving the second input, such as the selection of the stop vehicle selectable control 306. In such examples, the control signal may be delivered with limited delay, thereby maximizing the safe operation of the vehicle. In some examples, the operator computing device 106 may send the control signal 110 in response to receiving an instruction from the operator 104 to do so. In such examples, the interface may include a send control signal selectable control via which the operator 104 may input the instruction to send the control signal 110. For example, the operator 104 may input the constraint at a first time and, at a second time after the first time, may select the send control signal selectable control and cause the operator computing device to send the constraint to the vehicle computing system. In such an example, the operator may pre-load the constraint, and may cause the constraint to be delivered at a specific time, such as to enable the operator 104 to plan ahead for a condition or scenario known (by the operator 104) to occur at a particular location in the environment.

At operation 312, the operator computing device 106 determines whether a condition associated with the constraint is satisfied. In some examples, the operator computing device may determine that the condition is satisfied based on an input received from the operator 104, such as a release of the constraint, an indication that a previously observed potential conflict is no longer present, and/or the like. In such examples, the operator 104 may provide the indication that the condition associated with the constraint is satisfied. For example, the operator 104 may observe that an object 128 that was previously occluded from view of sensors of the vehicle 102a has moved into view of the vehicle and/or is no longer relevant to vehicular operation (e.g., turned away from the road, stopped at the intersection 122, etc.). The operator 104 may input, via the interface 108, an instruction to stop sending the control signal 110 and/or an indication that the potential conflict is no longer present.

In some examples, the operator computing device 106 may determine that the condition associated with the constraint is satisfied based on a determination that the vehicle 102a is operating based on the constraint. For example, the vehicle computing system may receive the control signal 110 including a constraint on continued movement of the vehicle 102a (e.g., an instruction to stop). The vehicle computing system may control the vehicle 102a to a stopped location. The operator computing device 106 may receive an indication that the vehicle 102a has stopped (e.g., input from operator 104, receive vehicle data associated with the vehicle 102a including speed, etc.), and based on the indication, the operator computing device 106 may determine that the condition associated with the constraint is satisfied.

Based on a determination that the condition associated with the constraint is not satisfied ("No" at operation 312), the operator computing device 106 may optionally continue to send the control signal 110 including the constraint. In some examples, the operator computing device 106 may send the control signal 110 as a single data packet (e.g., single, transitory instruction to implement the constraint). In such examples, the operator computing device 106 may not continue sending the control signal 110 based on a determination that the condition is not satisfied. In some examples, the control signal 110 may include a continuous signal including the constraint, thus providing a continuous instruction to apply the constraint while receiving the control signal 110. In such examples, based on the determination that the condition is not satisfied, the operator computing device 106 may continue sending the control signal 110 to the vehicle computing system.

Based on a determination that the condition associated with the constraint is satisfied ("Yes" at operation 312), the operator computing device 106, at operation 314, may optionally receive, via the interface 108, a third input including an instruction to send a release signal 316 to the vehicle computing system. In at least one example, the release signal 316 may include an instruction to remove the constraint from vehicle control considerations. That is, the release signal 316 may cause the vehicle computing system to cease applying the constraint, and to control the vehicle 102a at the exclusion of the constraint.

At operation 318, the operator computing device 106 sends, to the vehicle computing system, the release signal 316. In various examples, in response to receiving the release signal 316, the vehicle computing system may send a guidance request to a remote vehicle guidance system (e.g., remote vehicle guidance system 132), such as to request intervention by a remote operating system to confirm continued movement without application of the constraint. Additionally or alternatively, as described above, the vehicle computing system may send the guidance request in response to determining that another condition associated with the constraint is satisfied. The guidance request may include sensor data representative of the environment, constraint data associated with the control signal 110 (e.g., type of constraint, data associated with the remote operator and/or remote operating device (e.g., location 120, identifier, time associated with the control signal 110, etc.)), and a request to acknowledge and/or authorize continue operation at the exclusion of the constraint. In some examples, the remote vehicle guidance system and/or a remote operator associated therewith may evaluate the scenario in the environment based on the sensor data, and provide verification that the vehicle computing system may resume controlling the vehicle without remote guidance (e.g., at the exclusion of the constraint, acknowledge constraint removal, etc.).

In some examples, in response to receiving the release signal 316, the vehicle computing system may be configured to acknowledge constraint removal and determine that operations without the constraint may be resumed. In some examples, the vehicle computing system may process sensor data indicative of the environment to determine that an operator 104 observed potential conflict is no longer relevant to vehicular operation and/or that no other potential conflicts are observed in the environment. In some examples, the vehicle computing system may process the sensor data and determine that the observed potential conflict remains relevant, but that the object 128 associated therewith is currently in view, and a planner component of the vehicle computing system is capable of safely operating the vehicle with the object 128 in view. For example, the previously occluded object 128 may be in view of the sensors of the vehicle 102a, and therefore the vehicle computing system is able to observe movement of the object 128, determine a trajectory thereof, and avoid a conflict with the object 128. In various examples, the vehicle computing system may acknowledge the constraint (e.g., removes the constraint) and resume control the vehicle 102a at the exclusion of the constraint.

In various examples, controlling the vehicle 102a at the exclusion of the constraint may include maintaining a trajectory of the vehicle 102a, such as that determined and implemented based on the constraint. That is, in some examples, the vehicle computing system may determine to maintain the vehicle 102a in a same or similar state of operation as it was operating with the constraint, such as based on observed conditions in the environment. For example, the constraint included an instruction to stop movement, such as based on the observation of an object 128 occluded from view of the vehicle computing system. The operator 104 may determine to release the constraint based on a determination that the vehicle 102a has stopped and the object 128 has moved into view of the vehicle sensors. The vehicle computing system may process sensor data, which may then include a representation of the object 128 (e.g., a detected object). The vehicle computing system may determine a trajectory of the detected object, and may determine to yield to the object 128, such as by maintaining the vehicle at a stopped location until determining that the object 128 is no longer relevant to continued operations (e.g., movement toward a destination).

In some examples, controlling the vehicle 102a at the exclusion of the constraint may include modifying a trajectory of the vehicle 102a. In some examples, a modification to the trajectory may include a change in direction of travel, speed, acceleration, and/or the like. For example, based on the control signal, the vehicle computing system controls the vehicle 102a to the stopped location. In response to receiving the release signal, the vehicle computing system process sensor data and determines that the object 128 is not relevant to continued movement to the destination. The vehicle computing system may then determine one or more vehicle trajectories with speeds greater than zero and may control the vehicle according to the trajectories.

In some examples, such as when the vehicle is operated in a manual or semi-autonomous mode, controlling the vehicle 102a at the exclusion of the constraint may include removing the constraint to enable the operator to resume vehicular control. In such examples, the operator and/or the vehicle computing system (in the semi-autonomous mode) may control the vehicle to the destination.

Figure 4:
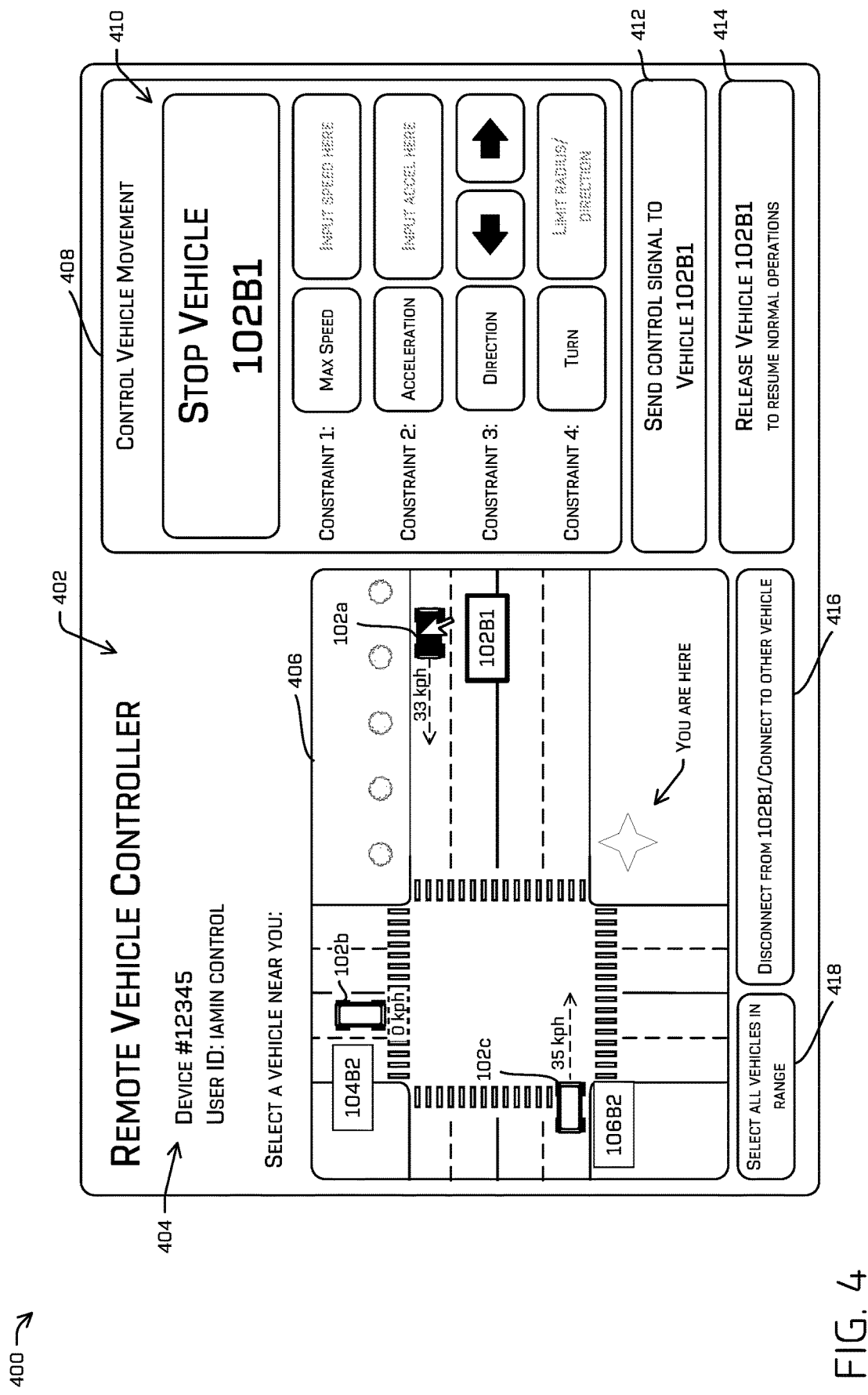
FIG. 4 is an example user interface configured to receive inputs associated with providing remote guidance to a vehicle.

FIG. 4 is an example user interface 400 configured to receive inputs associated with providing remote guidance to a vehicle. The user interface 400, such as interface 108, may be associated with an operator computing device, such as operator computing device 106. In at least one example, the user interface 400 may include a remote vehicle controller page 402 associated with remotely controlling one or more vehicles operating in an environment. As discussed above, the vehicle(s) may include vehicles configured to operate autonomously, semi-autonomously, and/or manually through the environment. In at least one example, an operator associated with the operator computing device, and thus the user interface 400, such as operator 104, may provide one or more inputs via the user interface 400 to remotely control the vehicle(s).

In some examples, the remote vehicle controller page 402 may include data associated with the operator and/or the device. In the illustrative example, the data includes a device identifier (e.g., numbers, letters, symbols, name, etc.) configured to uniquely identify the operator computing device and a user (operator) identifier (e.g., name (e.g., real name username, nickname), employment identification (e.g., employee identifier, contractor identifier, etc.), etc.) configured to uniquely identify the operator providing control signals via the remote vehicle controller page 402. Though this is not intended to be so limiting, and the data may include additional or alternate data, such as log in credentials, time operating the user interface 400 (e.g., start time, amount of time on-shift observing vehicle(s), etc.), a location of the operating computing device (e.g., latitude/longitude, address, intersection identifier, road identifier, etc.), a distance of the operating computing device to a dispatched location (e.g., 10 meters from physical location to which the operator was dispatched, etc.), an alert that a distance from the dispatched location is nearing a threshold distance (e.g., 12 meters, 30 feet, 3 blocks, etc.).

In the illustrative example, the remote vehicle controller page 402 includes a map 406, such as map 304, that includes representations of one or more vehicles 102 operating in the environment. In the illustrative example, the map 406 includes a first vehicle 102a, a second vehicle 102b, and a third vehicle 102c. Though this is not intended to be so limiting, and the map 406 may include a greater or lesser number of vehicles 102 operating in the environment. In some examples, the map 406 may include a number of vehicles 102 operating within a threshold distance (e.g., 3 blocks, 0.6 miles, 2 kilometers, etc.) of the operator and/or the operator computing device. In such examples, the map 406 may represent vehicles 102 connected to and/or eligible to establish a connection with and/or receive control signals from the operator computing device.

In at least one example, the map 406 may include a real-time and/or near real-time representation of locations of the vehicle(s) 102 operating in the environment. That is, the map 406 may include a moving map with representations of vehicle(s) as they are operating in the environment (e.g., moving, remaining stationary, etc.). In some examples, the map 406 may have associated therewith data corresponding to each of the depicted vehicles 102 and/or the movement thereof. Non-limiting examples of the data which may be presented include an identifier, operating details (e.g., trajectory, speed, direction of travel, acceleration, etc.), an indication of passengers in a vehicle 102, an indication of an operator in the vehicle 102, and/or the like. For example, as illustrated in FIG. 4, the data presented in association with the map 406 includes identifiers associated with each vehicle 102, a direction of travel associated with each moving vehicle 102 (e.g., arrow associated with vehicles 102*a* and 102*c*, no arrow (e.g., non-movement) associated with vehicle 102*b*), etc.), and a speed associated with each vehicle. Though this is not intended to be so limiting, and the map 406 may include additional or alternative data associated with each of the vehicles 102.

In at least one example, the map 406 may be configured to enable the operator to select a vehicle of the one or more vehicles 102, for control signal delivery. That is, the representations of the first vehicle 102*a*, the second vehicle 102*b*, and/or the third vehicle 102*c* may be selectable by the operator. In some examples, one or more of the vehicles 102 presented on the map 406 may be currently connected to and/or receiving a control signal from another operator. In such examples, map 406 may include an indication that the vehicle(s) 102 that are connected to and/or receiving control signals from the other operator are unavailable for connection and/or unavailable to receive control signals from the operator associated with the user interface. In some examples, two or more operators may be configured to connect to a single vehicle, such as the first vehicle 102*a*, at the same time, such as to provide a hand-off of or seamless transition from a first safety observer (e.g., first operator) to a second safety observer (e.g., second operator) located in the environment.

Additionally or alternatively, the vehicle(s) 102 may be represented as a collection (e.g., list) of vehicles available for connection. In some examples, the collection may be presented in order based on proximity to the operator computing device. In such examples, the operator computing device may monitor a distance between the operator (e.g., operator computing device) and locations of each vehicle 102, such as to maintain an updated (e.g., in real-time or near real-time) order of the collection of vehicle(s) 102. In some examples, the collection of vehicle(s) 102 and/or the vehicle(s) represented on the map 406 may include one or more vehicles 102 that share a network identifier with the operator computing device. In some examples, the collection of vehicle(s) and/or the vehicle(s) represented on the map 406 may include vehicle(s) 102 that previously established a connection and/or paired with the operator computing device. That is, the collection and/or the vehicle(s) 102 represented on the map 406 may include vehicle(s) configured to connect and/or already connected to the operator computing device 106.

In some examples, in response to receiving an indication of selection, via the map 406 and/or the collection of vehicles, the operator computing device may send, to a vehicle computing device associated with the selected vehicle 102, a connection request. For example, as illustrated in FIG. 4, the operator selects the first vehicle 102*a* for connection and/or control signal delivery. In response to receiving the indication of selection of the representation of first vehicle 102*a* on the map 406, the operator computing device sends the connection request to a vehicle computing system associated with the first vehicle 102*a*. In some examples, the connection request may include all or a portion of the data 404, such as to enable the vehicle computing system to verify authorization to connect and/or receive control signals from the operator computing device. In some examples, the connection request may be delivered via a network including a network identifier that is unique to the vehicle and one or more operator computing devices configured to connect thereto for control signal transmission. In such examples, the vehicle computing system may be configured to verify the connection request based on the network identifier.

In some examples, the connection request may be transmitted to the vehicle computing system, and a connection established, prior to control signal delivery. In such examples, the connection request and the control signal may be sent consecutively. In various examples, the connection request may be delivered to the vehicle computing system concurrently or substantially concurrently with a control signal (e.g., within a period of time (e.g., 0.5 seconds, 1 second, etc.). In such examples, the connection request and the control signal may be sent at substantially the same time.

In various examples, the operator computing device may generate the control signal, as described herein, in response to receiving one or more inputs, by the operator, via a vehicle control menu 408. In at least one example, the input(s) may represent constraints on operation of the selected vehicle (e.g., the first vehicle 102*a*). In various examples, the vehicle control menu 408 may include one or more control options 410 via which the constraint(s) may be input. In the illustrative example, the vehicle control menu 408 includes a stop vehicle selectable control, such as stop vehicle selectable control 306, a speed limitation control option, an acceleration control option, a direction control option, and a turn control option configured to enable the operator to limit a turn radius and/or direction of turn of the selected vehicle 102*a*. Though this is not intended to be so limiting, and a greater or lesser number of additional or alternative control options may be included in the vehicle control menu 408. For example, the vehicle control menu 408 may be configured to enable the operator to stop vehicle movement, but not limit other parameters of vehicle motion, such as by including a single control option including a stop vehicle selectable control.

In some examples, in response to receiving an indication of selection of one or more control options and/or an input associated therewith in association with the control option (e.g., a speed input in association with the speed limitation control option), the operator computing system may generate and send the control signal to the vehicle computing system associated with the selected vehicle 102*a*. In such examples, the operator computing device may send the control signal based on the inputs. In some examples, the remote vehicle controller page 402 may include a send control signal selectable control 412. In such examples, the operator may input one or more constraints associated with vehicular operation in the vehicle control menu 408, and in response to receiving an indication of selection of the send control signal selectable control 412, the operator computing device may send the control signal to the appropriate vehicle computing system.

In various examples, the remote vehicle controller page 402 may include a release vehicle selectable control 414. In some examples, in response to receiving an indication of selection of the release vehicle selectable control 414, the operator computing device may cease sending the control signal. In such examples, the control signal may include a continuous signal including the constraint that ceases in response to selection of the release vehicle selectable control 414. In some examples, in response to receiving an indication of selection of the release vehicle selectable control 414, the operator computing device may generate and send a release signal to the appropriate vehicle computing system. In some examples, the release signal may include an instruction to cease applying and/or remove the constraint from vehicle control considerations of the vehicle 102*a*. That is, the release signal may include an instruction to resume operation of the vehicle 102*a* at the exclusion of the constraint.

In the illustrative example, the remote vehicle controller page 402 includes a disconnect selectable control 416. In some examples, the disconnect selectable control 416 may be configured to enable the operator to manually disconnect from a selected vehicle. For example, in response to receiving an indication of selection of the disconnect selectable control 416, the operator computing device may disconnect from the vehicle computing system associated with the first vehicle 102*a*. In some examples, the disconnect selectable control 416 may be configured to end a connection session with the selected vehicle. In such examples, the operator computing device may remain connected to the vehicle computing device while in range, but the selected vehicle may be de-selected or disconnected from receiving subsequent control signals from the operator computing device. In various examples, the operator may end a connection session or de-select a first vehicle 102*a*, to enable a connection with another vehicle (e.g., the second vehicle 102*b*, the third vehicle 102*c*, etc.) operating in the environment.

In various examples, the remote vehicle controller page 402 may additionally include a select all vehicles control 418 configured to enable the user to select all vehicles within range (e.g., the first vehicle 102*a*, the second vehicle 102*b*, the third vehicle 102*c*, etc.) that are operating within the threshold distance of the operator and/or a connection associated therewith has a threshold signal strength. In such examples, the remote vehicle controller page 402 may be configured to enable the operator to send a broadcast message, such as with an operational command to all vehicles 102 in proximity to the operator. For example, the operator may determine that an area in the environment is associated with a slower maximum speed than previously determined, a posted speed, and/or the like. The operator may then select all vehicles within range and cause a broadcast control signal to be delivered to the vehicles 203. For another example, the operator may determine to stop vehicular operations proximate a location (e.g., location 120). The operator may then input a selection of the select all vehicles control 418 and send a control signal to the vehicles 102 to cause the vehicles to pull over out of a flow of traffic (e.g., stop operation at a stopping location).

FIGS. 2, 3, 5, and 6 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5:
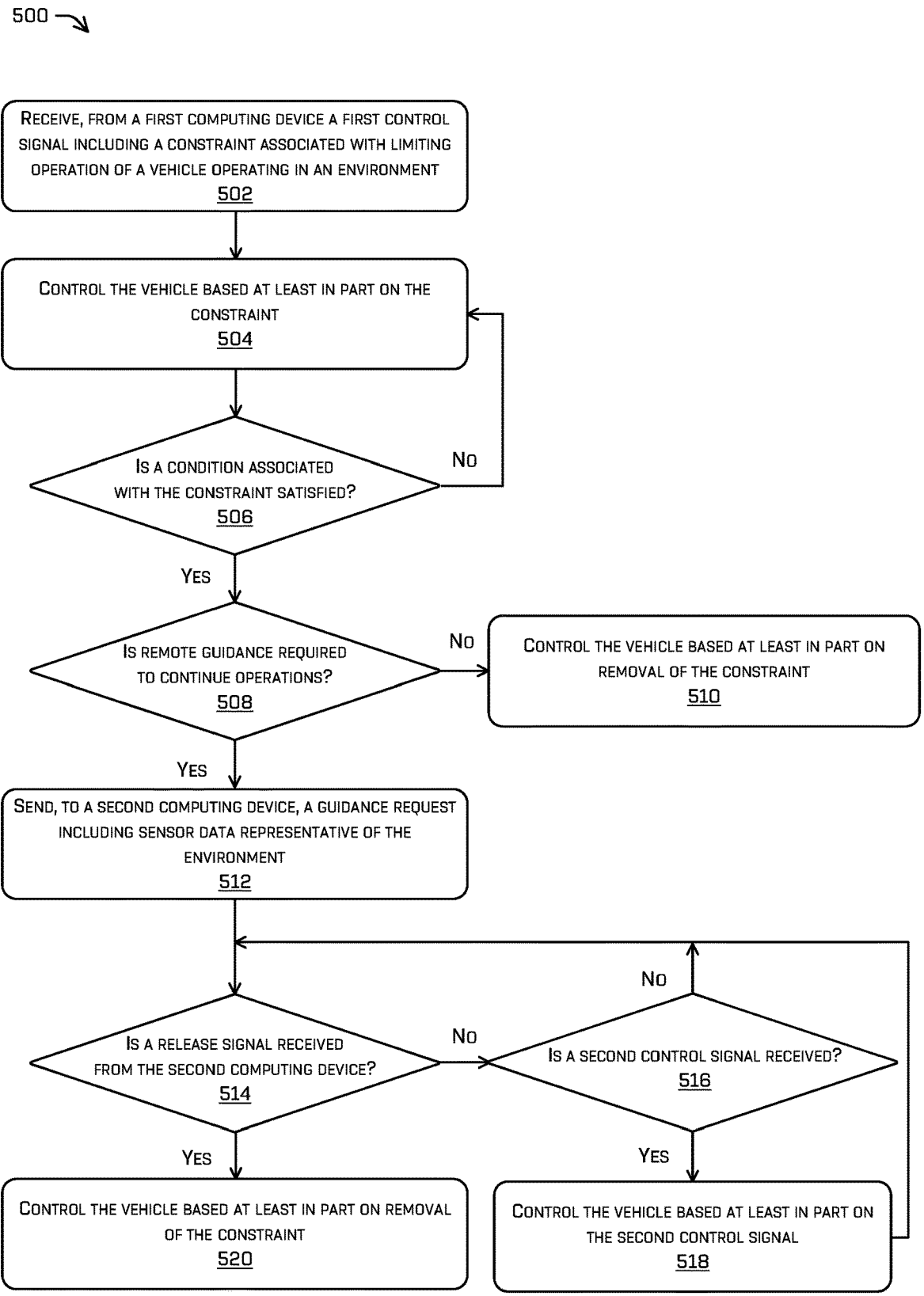
FIG. 5 depicts an example process for controlling a vehicle based on a control signal received from a remote computing device.

FIG. 5 depicts an example process 500 for controlling a vehicle based on a control signal (e.g., control signal 110) received from an operator computing device (e.g., operator computing device 106). Some or all of the process may be performed by a vehicle computing system associated with a vehicle, such as vehicle computing system 112 of FIG. 1 and/or vehicle computing device(s) 704 of FIG. 7.

At operation 502, the vehicle computing system receives, from a first computing device, a first control signal including a constraint associated with limiting operation of a vehicle operating in an environment. In at least one example, the first computing device may be an operator computing device associated with an operator located in the environment. In at least one example, the vehicle computing system may receive the first control signal via a network connection with the first computing device. In some examples, the vehicle computing system may connect with the first computing device in response to verifying an authentication thereof. That is, the vehicle computing system may validate a request from or verify an ability to connect to the first computing device, such as to receive one or more control signals therefrom. In some examples, the verification may be based on an identifier (e.g., device identifier, network identifier, etc.) associated with a connection request and/or the first control signal. For example, based on a determination that the first control signal is delivered via a first network with a first network identifier, the vehicle computing system may verify the authenticity of the first control signal and/or the first computing device.

At operation 504, the vehicle computing system controls the vehicle based at least in part on the constraint. As discussed above, the constraint may include one or more of a limitation on continued operation of the vehicle, a modification to a maximum speed, a modification to a maximum and/or minimum acceleration, a limitation on a direction of travel, a modification to a maximum or minimum radius of turn, a limitation on a direction of turn, and/or the like. In various examples, the vehicle computing system may receive the constraint and may apply the constraint to vehicle control considerations utilizing techniques such as those described in U.S. patent application Ser. No. 17/489,083, the entire contents of which are incorporated herein by reference above.

At operation 506, the vehicle computing system determines whether a condition associated with the constraint is satisfied. In some examples, a determination that the condition is satisfied may be based on a determination that the vehicle computing system is controlling the vehicle according to the constraint. That is, the condition may be satisfied based on a determination that the operation of the vehicle satisfies the constraint. In some examples, the determination that the condition associated with the constraint is satisfied may be based on a determination that the control signal has been released and/or that a release signal has been received from the first computing device.

Based on a determination that the condition is not satisfied ("No" at operation 506), the vehicle computing system controls the vehicle based at least in part on the constraint, as described in operation 504. Based on a determination that the condition is satisfied ("Yes" at operation 506), the vehicle computing system determines whether remote guidance is required to continue operations. The remote guidance may include guidance provided by a remote vehicle guidance system, such as remote vehicle guidance system 132.

Based on a determination that remote guidance is not required ("No" at operation 508), the vehicle computing system, at operation 510 controls the vehicle based at least in part on removal of the constraint (e.g., at the exclusion of the constraint) of the constraint. That is, the vehicle computing system may be configured to determine that continued operations in absence of the constraint are permitted and/or would be safe, and the vehicle computing system can cease applying the constraint in vehicle control considerations. In some examples, such as when the vehicle is operating in an autonomous or semi-autonomous mode, the vehicle computing system may determine one or more vehicle trajectories for the vehicle, and may control the vehicle in whole or in part based on the vehicle trajectory(ies).

Based on a determination that remote guidance is required to continue operations ("Yes" at operation 508), the vehicle computing system, at operation 512, sends, to a second computing device, a guidance request including sensor data representative of the environment. In at least one example, the second computing device may include a remote computing device, such as remote computing device(s) 114, that is associated with a remote vehicle guidance system, such as remote vehicle guidance system 132. The guidance request may include a request to verify that the vehicle may proceed through the environment based at least in part on the removal of the constraint. In various examples, the vehicle computing system may be configured to determine remote guidance is required and automatically send the guidance request to the remote vehicle guidance system, such as in response to receiving and/or processing the control signal. That is, in response to receiving a control signal, the vehicle computing system may be programmed to request confirmation, from a remote operator and/or the remote vehicle guidance system, that continued operations in absence of the constraint are permitted and/or that such operations would be safe.

At operation, the vehicle computing system determines whether a release signal is received from the second computing device. The release signal may include an instruction to remove or withhold the constraint from vehicle control considerations. Based on a determination that the release signal is received not from the second computing device ("No" at operation 514), the vehicle computing system, at operation 516 determines whether a second control signal is received. In some examples, the second control signal may include an instruction to control the vehicle according to one or more other constraints, such as those determined by the remote operator. In some examples, the second control signal may include one or more waypoints and/or orientations associated with vehicular navigation through the environment, such as described in U.S. patent application Ser. No. 16/457,646, the entire contents of which are incorporated herein by reference above.

Based on a determination that the second control signal is not received ("No" at operation 516), the vehicle computing system may determine whether the release signal is received from the second computing device, as described with respect to operation 514. Based on a determination that the second control signal is received ("Yes" at operation 516), the vehicle computing system, at operation 518, controls the vehicle based at least in part on the second control signal. That is, the vehicle computing system may generate one or more trajectories for the vehicle to travel through the environment based on the second control signal. In various examples, after initiating control of the vehicle based at least in part on the second control signal, the vehicle computing system may determine whether the release signal is received from the second computing device, as described with respect to operation 514.

Based on a determination that the release signal is received ("Yes" at operation 514), the vehicle computing system, at operation 520, controls the vehicle based at least in part on removal of the constraint (e.g., at the exclusion of the constraint) of the constraint. That is, the vehicle computing system may remove or otherwise withhold the constraint from vehicle control considerations.

Figure 6:
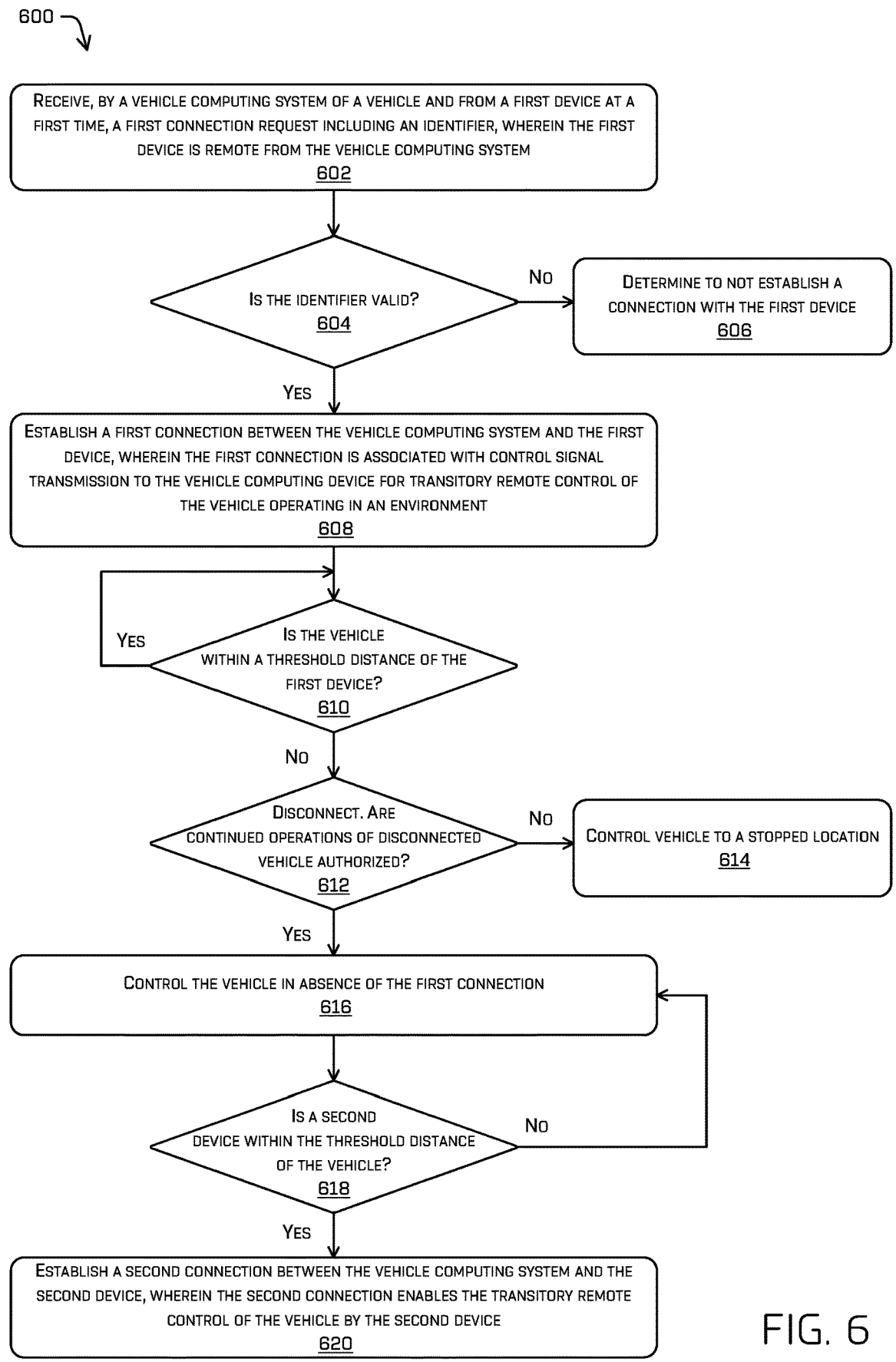
FIG. 6 depicts an example process for connecting to, and receiving vehicle control guidance from, one or more remote computing devices.

FIG. 6 depicts an example process 600 for depicts an example process for connecting to, and receiving vehicle control guidance from, one or more remote computing devices, such as an operator computing device. Some or all of the process 600 may be performed by vehicle computing system, such as vehicle computing system 112 of FIG. 1 and/or vehicle computing device(s) 704 of FIG. 7.

At operation 602, the vehicle computing system receives, from a first device at a first time, a first connection request including an identifier, wherein the first device is remote from the vehicle computing device. In at least one example, the first device may include an operator computing device, such as operator computing device 106. In some examples, the identifier may include a network identifier associated with a network via which the first connection request is delivered. In at least one example, the identifier may include one or more letters, symbols, numbers, and/or the like configured to uniquely identify the first device and/or a network via which the first connection request is transmitted.

At operation 604, the vehicle computing system determines whether the identifier is valid. In some examples, the vehicle computing system may determine whether the identifier is valid based on a determination that the first connection request is received via a network associated with a network identifier) that is associated with both the vehicle computing system and the first device, such as for control signal transmission. In some examples, the vehicle computing system determines that the identifier is valid based on a determination that the identifier includes a device identifier of an authorized device from which to receive control signals. In some examples, the vehicle computing system may have associated therewith a database including one or more device identifiers associated with one or more devices configured to provide control signals. In such examples, the vehicle computing system may access the database to determine identifier validity.

Based on a determination that the identifier is invalid ("No" at operation 604), the vehicle computing system, at operation 606, determines to not establish a connection (e.g., connection session) with the first device. In some examples, the connection may include a connection via a private network and/or a connection session associated with control signal and/or release signal transmissions. In some examples, the vehicle computing system may send a notification to the first device, informing the first device and/or an operator associated therewith that the connection failed due to identifier invalidity. In such examples, the notification may be delivered via a public network or other less secure network connection that is unassociated with control signal transmissions.

Based on a determination that the identifier is valid ("Yes" at operation 604), the vehicle computing system, at operation 608, establishes a first connection between the vehicle computing system and the first device, wherein the first connection is associated with control signal transmission to the vehicle computing system for transitory (e.g., ephemeral, temporary, etc.) remote control of a vehicle operating in an environment. In at least one example, the first connection may include a private connection, such as on a private network, between the vehicle computing system and the first device. In some examples, the first connection may include an initial pairing or other type of connection between the vehicle computing system and the first device. That is, the first connection may include an initial connection between the vehicle computing system and the first device, which may facilitate subsequent connections and/or disconnections during vehicular operation.

At operation 610, the vehicle computing system determines whether the vehicle is within a threshold distance of the first device. In some examples, the threshold distance may be associated with a threshold signal strength associated with a network signal and/or connection between the first device and the vehicle computing system. In various examples, the vehicle computing system may be configured to connect and/or disconnect from the first device one or more times throughout vehicular operation in the environment. In at least one example, the connection(s) and/or disconnection(s) may be based on whether a distance between the devices is equal to or less than the threshold distance (e.g., 5 blocks, 0.5 miles, 1 kilometer, etc.) and/or a signal strength of a first connection signal meets or exceeds a threshold signal strength. Based on a determination that the distance is equal to or less than the threshold distance and/or meets or exceeds the threshold signal strength ("Yes" at operation 610), the vehicle computing system continues to monitor the locations of the devices, continually, periodically, and/or intermittently verifying that the distance is within the threshold distance and/or threshold signal strength. Additionally, the vehicle computing system may maintain the first connection based on the determination that the first device is within the threshold distance of the first device and/or maintains at least the threshold signal strength with the first device (e.g., within range of the first device).

Based on a determination that the distance between the devices exceeds the threshold distance and/or the signal strength drops below the threshold signal strength ("No" at operation 610), the vehicle computing system, at operation 612, disconnects from the first device and determines whether continued operations of the disconnected vehicle are authorized. In various examples, the vehicle computing system may be programmed to operate in the environment when connected to an operator computing device (e.g., when monitored by a safety observer). In such examples, absent a connection with an operator computing device, such as the first device, the vehicle computing system may determine that continued operations are not authorized. In some examples, the vehicle computing system may be programmed to operate in certain regions of the environment without a safety observer. In such examples, the determination as to whether the continued operations of the disconnected vehicle are authorized may be based on a determination as to whether a location of the vehicle corresponds to a region in which the vehicle(s) are authorized to operate without the safety observer.

Based on a determination that operations are not permitted without an established connection with a safety observer ("No" at operation 612), the vehicle computing system, at operation 614, controls the vehicle to a stopped location. In various examples, the vehicle computing system may be programmed to allow operation (e.g., autonomous operation) in the environment based on a determination that a signal (e.g., heartbeat signal) is received from at least one operator computing device. In such examples, the vehicle computing system may determine a trajectory to the stopped location based on a determination that the signal is not received and/or the strength of the signal falls below a threshold signal strength (e.g., threshold signal strength associated with receiving control signals). In some examples, the stopped location may include a location out of a flow of traffic, such as a parking spot, a parking lot, a shoulder of a road, and/or the like.

Based on a determination that operations are permitted without an established connection ("Yes" at operation 612), the vehicle computing system, at operation 616, controls the vehicle in absence of the first connection. As discussed above, the vehicle can include a vehicle configured to operate in an autonomous mode, a semi-autonomous mode, and/or a manual mode. Accordingly, the vehicle computing system may control, or cause the vehicle to be controlled by an operator, based on the mode of operation that is currently established for the vehicle. In various examples, the vehicle may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, since the vehicle may be configured to control all functions from start to stop, including all parking functions, it may be unoccupied.

At operation 618, the vehicle computing system may determine whether a second device is within a threshold distance of the vehicle. As discussed above, the threshold distance may be associated with a threshold signal strength associated with a network signal and/or connection between the second device and the vehicle computing system. The second device may include a second operator computing device associated with a second operator configured to generate and send control signals to the vehicle, such as via an interface (e.g., interface 108, user interface 400, etc.). Based on a determination that the second device is not within the threshold distance and/or that either no signal or the threshold signal strength is not received ("No" at operation 618), the vehicle computing system may control the vehicle in absence of the first connection and a second connection, as described at operation 616.

Based on a determination that the second vehicle is within the threshold distance of the vehicle and/or a second signal from the second device meets or exceeds the threshold signal strength ("Yes" at operation 618), the vehicle computing system, at operation 620, establishes a second connection between the vehicle computing system and the second device, wherein the second connection enables the transitory remote control of the vehicle by the second device. In at least one example, the second connection may include a private connection, such as on a private network, between the vehicle computing system and the second device.

Figure 7:
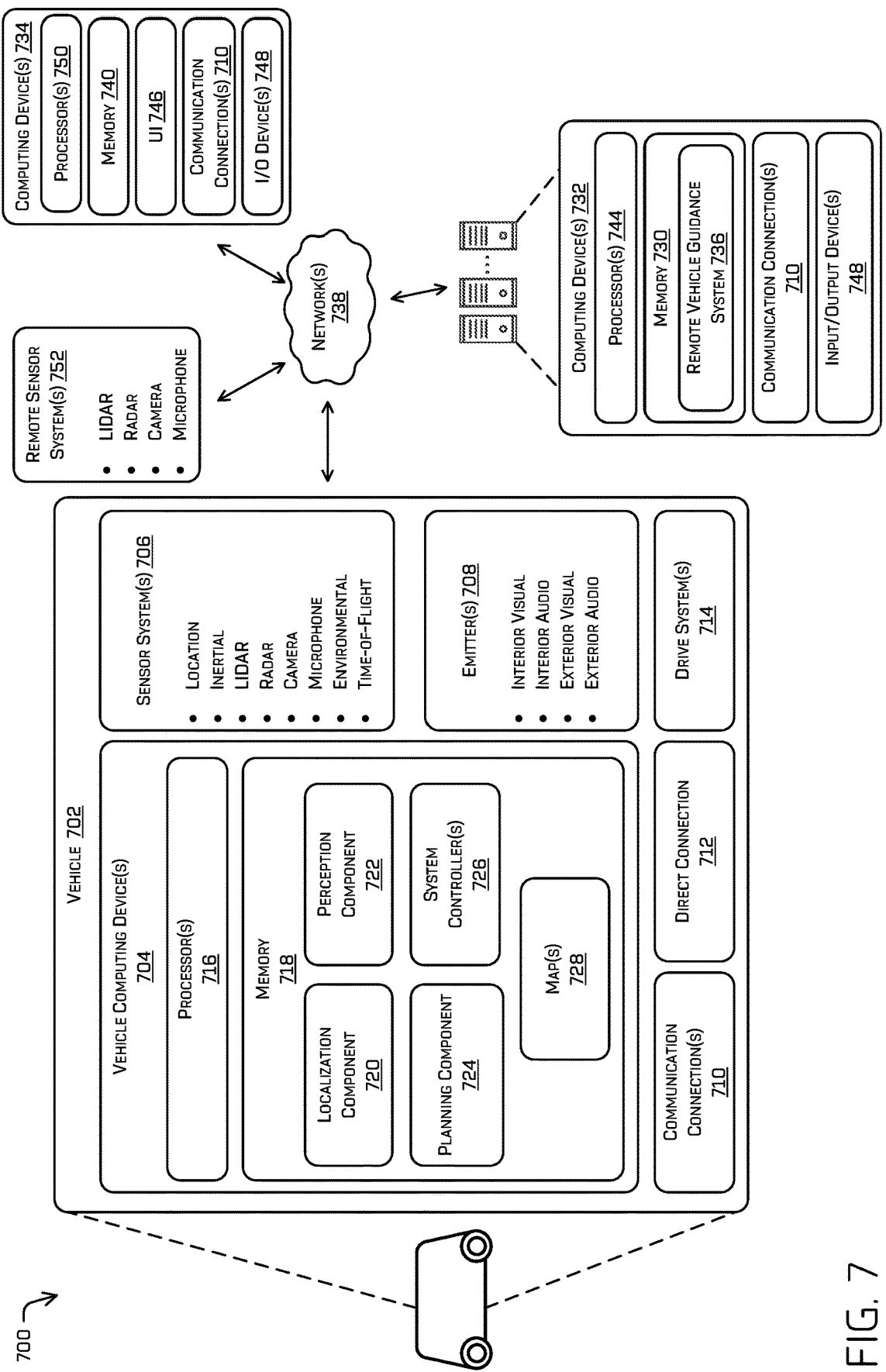
FIG. 7 is a block diagram of an example system for implementing the techniques described herein.

FIG. 7 is a block diagram of an example system 700 for implementing the techniques described herein. In at least one example, the system 700 may include a vehicle 702, such as vehicle 102.

The vehicle 702 may include one or more vehicle computing devices 704, one or more sensor systems 706, one or more emitters 708, one or more communication connections 710, at least one direct connection 712, and one or more drive systems 714.

The vehicle computing device(s) 704 may include one or more processors 716 and memory 718 communicatively coupled with the one or more processors 716. In the illustrated example, the vehicle 702 is an autonomous vehicle; however, the vehicle 702 could be any other type of vehicle, such as a semi-autonomous vehicle, or any other system having at least an image capture device (e.g., a camera enabled smartphone). In the illustrated example, the memory 718 of the vehicle computing device(s) 704 stores a localization component 720, a perception component 722, a planning component 724, one or more system controllers 726, and one or more maps 728. Though depicted in FIG. 7 as residing in the memory 718 for illustrative purposes, it is contemplated that the localization component 720, a perception component 722, a planning component 724, one or more system controllers 726, and one or more maps 728 may additionally, or alternatively, be accessible to the vehicle 702 (e.g., stored on, or otherwise accessible by, memory remote from the vehicle 702, such as, for example, on memory 730 of a service computing device(s) 732).

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 728 and may continuously determine a location and/or orientation of the autonomous vehicle within the map. In various examples, the map(s) 728 may include road segments identifications (e.g., numbers, etc.) associated with various portions of the roads on the map(s). In some examples, the road segment identifications may be associated with a road network managed at least in part by the service computing device(s) 732. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 720 may provide data to various components of the vehicle 702 to determine an initial position of an autonomous vehicle for determining whether an object is relevant to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position, e.g., height), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a zone associated with the environment (e.g., school zone, business district, etc.), a time of day, a day of a week, a season, a weather condition, an indication of darkness/light, etc.

In general, the planning component 724 may determine a path (e.g., initial route, planned path, etc.), for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). In some examples, the planning component 724 may generate an instruction for guiding the autonomous vehicle 702 along at least a portion of the route from a first location to the second location.

In various examples, the planning component 724 may be configured to process a control signal, such as control signal 110, received from one or more computing devices 734 (e.g., operator computing device 106, etc.). In at least one example, the computing device(s) 734 include operator computing device(s), such as operator computing device 106. In various examples, the planning component 724 may be configured to receive a control signal including a constraint and determine one or more trajectories for the vehicle 702 to follow based on the trajectory(ies).

In various examples, the planning component 724 may be configured to receive data from a remote vehicle guidance system 736, such as remote vehicle guidance system 132. In some examples, the data may include a release signal, such as to release a constraint received from the computing device(s) 734 and/or to enable the vehicle 702 to operate at the exclusion of the constraint. In some examples, the data may include data associated with waypoints and/or orientations for the vehicle 702 to follow, such as while operating in a remote guidance mode (e.g., remote vehicle guidance system 736 providing instructions on where and/or how to control the vehicle 702. In some examples, the planning component 724 may be configured to validate the data (e.g., the waypoints and/or orientations). In at least one example, the planning component 724 may determine how to guide the autonomous vehicle 702 from a first waypoint received from the remote vehicle guidance system 736 to a second waypoint received from the remote vehicle guidance system 736. In some examples, the instruction may be a trajectory, or a portion of a trajectory.

In some examples, the planning component 724 may include a prediction component to generate predicted trajectories of objects (e.g., objects) in an environment. For example, a prediction component may generate one or more predicted trajectories for dynamic objects detected in an environment. In some examples, the predicted trajectories may include any number of potential paths in which a detected object may travel from a current position (e.g., at the time of perception) and/or based on a direction of travel. In some examples, the predicted trajectories may represent a distance and direction in which the object will travel over a period of time. In some examples, a prediction component may measure a trace of an object and generate a trajectory for the object based on observed and predicted behavior. In various examples, the prediction component may determine predicted trajectories based on one or more of machine learning techniques, heat maps, temporal logic, and/or tree search methods.

In at least one example, the vehicle computing device(s) 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The memory 718 may further include one or more maps 728 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 728. That is, the map(s) 728 may be used in connection with the localization component 720, the perception component 722, and/or the planning component 724 to determine a location of the vehicle 702, detect objects in an environment, generate routes, determine actions and/or trajectories to navigate within an environment. In various examples, the map(s) 728 may include a road network. The road network may include one or more distinct road segments.

In some examples, the one or more maps 728 may be stored on one or more remote computing device(s) 732. In some examples, multiple maps 728 may be stored based on, for example, a characteristic (e.g., type of entity, time of day, day of week, season of the year, etc.). Storing multiple maps 728 may have similar memory requirements but increase the speed at which data in a map may be accessed.

As can be understood, the components discussed herein (e.g., the localization component 720, the perception component 722, the planning component 724, the one or more system controller(s) 726, and the one or more maps 728 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 718 (as well as memory 730 and memory 740, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device(s) 704.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702, the remote computing device(s) 732, and/or the computing device(s) 734 may also include one or more communication connection(s) 710 that enable communication between the vehicle 702 and the remote computing device(s) 732 and/or other local computing device(s) on the vehicle 702 and/or the drive system(s) 714. Also, the communication connection(s) 710 may allow the vehicle 702 to communicate with other nearby computing device(s) (e.g., other nearby vehicles, etc.).

The communications connection(s) 710 may include physical and/or logical interfaces for connecting the vehicle computing device(s) 704 to another computing device or a network, such as network(s) 738 (e.g., network(s) 116). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive system(s) 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 714. Furthermore, the drive system(s) 714 may also include one or more communication connection(s) that enable communication by the respective drive system with one or more other local or remote computing device(s).

In at least one example, the direct connection(s) 712 may provide a physical interface to couple the one or more drive system(s) 714 with the body of the vehicle 702. For example, the direct connection(s) 712 may allow the transfer of energy, fluids, air, data, etc. between the drive system(s) 714 and the vehicle. In some instances, the direct connection(s) 712 may further releasably secure the drive system(s) 714 to the body of the vehicle 702.

In at least one example, the localization component 720, the perception component 722, the planning component 724, the one or more system controllers 726, and the one or more maps 728 may process sensor data, as described above, and may send their respective outputs, over the one or more networks 738, to the remote computing device(s) 732. In at least one example, the localization component 720, the perception component 722, the planning component 724, the one or more system controllers 726, and the one or more maps 728 may send their respective outputs to the remote computing device(s) 732 at a particular frequency, after a lapse of a predetermined period of time, in near real-time, etc.

In some examples, the vehicle 702 may send sensor data to the remote computing device(s) 732 via the network(s) 738. Additionally or alternatively, the remote computing device(s) 732 may receive sensor data from one or more remote sensor systems 752, such as sensor(s) 124. In some examples, the vehicle 702 may receive sensor data from the remote computing device(s) 732, remote sensor system(s) 752, and/or other vehicles 702 via the network(s) 738. The sensor data may include raw sensor data and/or processed sensor data and/or representations of sensor data. In some examples, the sensor data (raw or processed) may be sent and/or received as one or more log files.

The remote computing device(s) 732 may include one or more processors 744 and the memory 730 storing the remote vehicle guidance system 736 In some examples, the remote vehicle guidance system 736 may include a graphical user interface, which may be configured to receive input from an operator representative of one or more waypoints and/or orientations for providing remote guidance to the vehicle 702, such as that described above. Similarly, the computing device(s) 734 may include a user interface 746 configured to receive user input associated with remote control of the vehicle. In some examples, the input received via the user interface 746 may include one or more constraints on operation of the vehicle 702, as described above. The input associated with the remote vehicle guidance system 736 and/or the user interface 746 may be received via one or more input/output devices 748. The input/output device(s) 748 may include one or more of a keyboard, a mouse, a touch screen display, a haptic device, microphone, camera, and/or any other device configured to input and/or output data to/from the remote computing device(s) 732 and/or computing device(s) 734.

The processor(s) 716 of the vehicle 702, the processor(s) 744 of the remote computing device(s) 732, and/or the processor(s) 750 of the computing device(s) 734 may be any suitable processor capable of executing instructions to process data and perform operations as described herein. By way of example and not limitation, the processor(s) 716, 744, and 750 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718, 730, and 740 are examples of non-transitory computer-readable media. The memory 718, 730, and 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718, 730, and 740 may include at least a working memory and a storage memory. For example, the working memory may be a high-speed memory of limited capacity (e.g., cache memory) that is used for storing data to be operated on by the processor(s) 716, 744, and 750. In some instances, the memory 718, 730, and 740 may include a storage memory that may be a lower-speed memory of relatively large capacity that is used for long-term storage of data. In some cases, the processor(s) 716, 744, and 750 cannot operate directly on data that is stored in the storage memory, and data may need to be loaded into a working memory for performing operations based on the data, as discussed herein.

Example Clauses

A: One or more non-transitory computer-readable media storing instructions that, when executed by one or more processors, cause a vehicle computing system of a vehicle to: receive, from a first computing device, a control signal comprising a constraint associated with limiting operation of the vehicle operating in an autonomous mode in an environment, wherein the first computing device is associated with a first operator located in the environment and remote from the vehicle; control the vehicle based at least in part on the constraint; based at least in part on a determination that a condition associated with the constraint is satisfied, send, to a second computing device associated with a second operator located remote from the environment, a guidance request comprising sensor data representative of the environment; receive, from the second computing device and based at least in part on the guidance request, a release signal comprising an instruction to remove the constraint, wherein the release signal is based at least in part on the sensor data; and control the vehicle in the autonomous mode based at least in part on removal of the constraint.

B: The one or more non-transitory computer-readable media of paragraph A, wherein the constraint comprises a limitation on at least one of: continued movement of the vehicle; a speed; an acceleration; a turning radius; a mission type; operating the vehicle in an area; or a direction of travel.

C: The one or more non-transitory computer-readable media of either paragraph A or paragraph B, wherein the instructions further cause the vehicle to: determine that the condition is satisfied based at least in part on at least one of a determination that a vehicle speed is equal to or less than a maximum speed associated with the constraint; a threshold time period associated with the constraint has expired; or a threshold distance associated with operating with the constraint has been traveled; a fault associated with the condition being resolved; or a determination that the vehicle is out of range of the first computing device.

D: The one or more non-transitory computer-readable media of any one of paragraphs A-C, wherein the control signal is received at a first time and the instructions further cause the vehicle computing system to: receive, from the first computing device at a second time prior to the first time, a connection request comprising an identifier associated with the first computing device; and establish a connection with the first computing device based at least in part on a validation of the identifier, wherein the control signal is received via the connection.

E: The one or more non-transitory computer-readable media of any one of paragraphs A-D, wherein the control signal is a first control signal, the instructions further causing the vehicle computing system to: establish a first connection with the first computing device at a first time prior to a second time associated with receiving the first control signal; establish, at a third time after the second time, a second connection with a third computing device associated with a third operator located in the environment and remote to the vehicle, wherein the second connection enables receipt of one or more control signals from the third computing device; and determine, based at least in part on the second connection, to disconnect the first connection with the first computing device.

F: A method comprising: receiving, from a computing device, a control signal comprising a constraint associated with limiting operation of a vehicle operating in an autonomous mode in an environment, wherein the computing device is associated with an operator located in the environment in proximity to the vehicle; controlling the vehicle based at least in part on the constraint; determining that a condition associated with the constraint is satisfied; and controlling the vehicle in the autonomous mode based at least in part on the condition being satisfied.

G: The method of paragraph F, wherein a determination that the operator is in proximity to the vehicle is based at least in part on at least one of: determining that a vehicle location of the vehicle is within a threshold distance of an operator location associated with the computing device; or determining that a connection signal between the computing device and a vehicle computing system associated with the vehicle meets or exceeds a threshold signal strength.

H: The method of either paragraph F or paragraph G, wherein the constraint comprises a limitation on at least one of: continued movement of the vehicle; a speed; an acceleration; a turning radius; a mission type; operating the vehicle in an area; or a direction of travel.

I: The method of any one of paragraphs F-H, further comprising: determining that the constraint is associated with a guidance system located remote from the environment and configured to provide operational guidance to the vehicle; sending, to a second computing device associated with the guidance system, a guidance request comprising sensor data representative of the environment; and receiving, from the second computing device, a release signal comprising an instruction to remove the constraint, wherein the release signal is based at least in part on the sensor data, wherein determining that the condition associated with the constraint is satisfied is based at least in part on receiving the release signal.

J: The method of any one of paragraphs F-I, wherein the constraint comprises a limitation on continued movement of the vehicle, the method further comprising: determining a deceleration associated with stopping the vehicle; and determining, based at least in part on a determination that the vehicle has stopped movement, that the condition associated with the constraint is satisfied.

K: The method of any one of paragraphs F-J, wherein determining that the condition is satisfied comprises at least one of: determining that a vehicle speed is equal to or less than a maximum speed associated with the constraint; determining that a threshold time period associated with the constraint has expired; determining that the vehicle has traveled a distance, subsequent to receiving the control signal, that meets or exceeds a threshold distance associated with the constraint; determining that a fault associated with the condition is resolved; or determining that the vehicle is out of range of the computing device.

L: The method of any one of paragraphs F-K, wherein the control signal is received at a first time, the method further comprising: receiving, from the computing device at a second time prior to the first time, a connection request comprising an identifier associated with the computing device; and establishing a connection with the computing device based at least in part on a validation of the identifier, wherein the control signal is received via the connection.

M: The method of any one of paragraphs F-L, further comprising: receiving, from the computing device, a release signal comprising an instruction to remove the constraint; and controlling the vehicle in the autonomous mode based at least in part on removal of the constraint.

N: The method of any one of paragraphs F-M, further comprising: determining that at least one of: a distance between a vehicle location of the vehicle and a device location of the computing device meets or exceeds a threshold distance; or a connection signal between a vehicle computing system associated with the vehicle is equal to or less than a threshold signal strength; disconnecting from the computing device; and performing at least one of controlling the vehicle to a stopped location based at least in part on lack of connection with the computing device; or determining that the vehicle location of the vehicle is associated with autonomous operation of the vehicle without an observer; and controlling the vehicle in the autonomous mode without a connection with a remote computing device configured to provide control signals.

O: The method of any one of paragraphs F-N, wherein the computing device is a first computing device and the control signal is a first control signal, the method further comprising: establishing a first connection with the first computing device at a first time prior to a second time associated with receiving the first control signal; establishing, at a third time after the second time, a second connection with a second computing device associated with a second operator located in the environment and remote to the vehicle, wherein the second connection enables receipt of one or more control signals from the second computing device; and determining, based at least in part on the second connection, to disconnect the first connection with the first computing device.

P: The method of any one of paragraphs F-O, wherein the control signal is received by a primary controller of a vehicle computing system associated with the vehicle, the primary controller being independent of a planner component of the vehicle computing system.

Q: A system comprising: one or more processors; one or more computer-readable media storing instructions that, when executed by the one or more processors, cause the system to: receive, from a computing device, a control signal comprising a constraint associated with limiting operation of a vehicle operating in an autonomous mode in an environment, wherein the computing device is associated with an operator located in the environment in proximity to the vehicle; control the vehicle based at least in part on the constraint; determine that a condition associated with the constraint is satisfied; and control the vehicle in the autonomous mode based at least in part on the condition being satisfied.

R: The system of paragraph Q, wherein the instructions further cause the system to: determine that the constraint is associated with a guidance system located remote from the environment and configured to provide operational guidance to the vehicle; send, to a second computing device associated with the guidance system, a guidance request comprising sensor data representative of the environment; and receive, from the second computing device, a release signal comprising an instruction to remove the constraint, wherein the release signal is based at least in part on the sensor data, wherein determining that the condition associated with the constraint is satisfied is based at least in part on receiving the release signal.

S: The system of either paragraph Q or paragraph R, wherein the constraint comprises a limitation on continued movement of the vehicle and the instructions further cause the system to: determine a deceleration associated with stopping the vehicle; and determine, based at least in part on a determination that the vehicle has stopped movement, that the condition associated with the constraint is satisfied.

T: The system of any one of paragraphs Q-S, wherein the control signal is received at a first time and the instructions further cause the system to: receive, from the computing device at a second time prior to the first time, a connection request comprising an identifier associated with the computing device; and establish a connection with the computing device based at least in part on a validation of the identifier, wherein the control signal is received via the connection.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions that, when executed by one or more processors, cause a vehicle computing system of a vehicle to:
   receive, from a first computing device, a control signal comprising a constraint associated with limiting operation of the vehicle operating in an autonomous mode in an environment, wherein the first computing device is associated with a first operator located in the environment and remote from the vehicle;
   control the vehicle based at least in part on the constraint;
   determine that a condition associated with the constraint is satisfied;
   based at least in part on the determination that the condition associated with the constraint is satisfied, send, to a second computing device associated with a second operator located remote from the environment, a guidance request comprising sensor data representative of the environment;
   receive, from the second computing device and based at least in part on the guidance request, a release signal comprising an instruction to remove the constraint, wherein the release signal is based at least in part on the sensor data; and
   control the vehicle in the autonomous mode based at least in part on removal of the constraint.

2. The one or more non-transitory computer-readable media of claim 1, wherein the constraint comprises a limitation on at least one of:
   continued movement of the vehicle;
   a speed;
   an acceleration;
   a turning radius;
   a mission type;
   operating the vehicle in an area; or
   a direction of travel.

3. The one or more non-transitory computer-readable media of claim 1, wherein the instructions further cause the vehicle to:
   determine that the condition is satisfied based at least in part on at least one of:
      a determination that a vehicle speed is equal to or less than a maximum speed associated with the constraint;
      a threshold time period associated with the constraint has expired; or
      a threshold distance associated with operating with the constraint has been traveled;
      a fault associated with the condition being resolved; or
      a determination that the vehicle is out of range of the first computing device.

4. The one or more non-transitory computer-readable media of claim 1, wherein the control signal is received at a first time and the instructions further cause the vehicle computing system to:
   receive, from the first computing device at a second time prior to the first time, a connection request comprising an identifier associated with the first computing device; and
   establish a connection with the first computing device based at least in part on a validation of the identifier, wherein the control signal is received via the connection.

5. The one or more non-transitory computer-readable media of claim 1, wherein the control signal is a first control signal, the instructions further causing the vehicle computing system to:
   establish a first connection with the first computing device at a first time prior to a second time associated with receiving the first control signal;
   establish, at a third time after the second time, a second connection with a third computing device associated with a third operator located in the environment and remote to the vehicle, wherein the second connection enables receipt of one or more control signals from the third computing device; and
   determine, based at least in part on the second connection, to disconnect the first connection with the first computing device.

6. A method comprising:
   receiving, from a computing device, a control signal comprising a constraint associated with limiting operation of a vehicle operating in an autonomous mode in an environment, wherein the computing device is associated with an operator located in the environment in proximity to the vehicle;
   controlling the vehicle based at least in part on the constraint;

determining that a condition associated with the constraint is satisfied; and controlling the vehicle in the autonomous mode based at least in part on the condition being satisfied.

7. The method of claim 6, wherein a determination that the operator is in proximity to the vehicle is based at least in part on at least one of:

determining that a vehicle location of the vehicle is within a threshold distance of an operator location associated with the computing device; or determining that a connection signal between the computing device and a vehicle computing system associated with the vehicle meets or exceeds a threshold signal strength.

8. The method of claim 6, wherein the constraint comprises a limitation on at least one of:

continued movement of the vehicle;
a speed;
an acceleration;
a turning radius;
a mission type;
operating the vehicle in an area; or
a direction of travel.

9. The method of claim 6, further comprising:

determining that the constraint is associated with a guidance system located remote from the environment and configured to provide operational guidance to the vehicle;

sending, to a second computing device associated with the guidance system, a guidance request comprising sensor data representative of the environment; and receiving, from the second computing device, a release signal comprising an instruction to remove the constraint, wherein the release signal is based at least in part on the sensor data, wherein determining that the condition associated with the constraint is satisfied is based at least in part on receiving the release signal.

10. The method of claim 6, wherein the constraint comprises a limitation on continued movement of the vehicle, the method further comprising:

determining a deceleration associated with stopping the vehicle; and determining, based at least in part on a determination that the vehicle has stopped movement, that the condition associated with the constraint is satisfied.

11. The method of claim 6, wherein determining that the condition is satisfied comprises at least one of:

determining that a vehicle speed is equal to or less than a maximum speed associated with the constraint;

determining that a threshold time period associated with the constraint has expired;

determining that the vehicle has traveled a distance, subsequent to receiving the control signal, that meets or exceeds a threshold distance associated with the constraint;

determining that a fault associated with the condition is resolved; or determining that the vehicle is out of range of the computing device.

12. The method of claim 6, wherein the control signal is received at a first time, the method further comprising:

receiving, from the computing device at a second time prior to the first time, a connection request comprising an identifier associated with the computing device; and establishing a connection with the computing device based at least in part on a validation of the identifier, wherein the control signal is received via the connection.

13. The method of claim 6, further comprising:

receiving, from the computing device, a release signal comprising an instruction to remove the constraint; and controlling the vehicle in the autonomous mode based at least in part on removal of the constraint.

14. The method of claim 6, further comprising:

determining that at least one of:

a distance between a vehicle location of the vehicle and a device location of the computing device meets or exceeds a threshold distance; or a connection signal between a vehicle computing system associated with the vehicle is equal to or less than a threshold signal strength;

disconnecting from the computing device; and performing at least one of:

controlling the vehicle to a stopped location based at least in part on lack of connection with the computing device; or determining that the vehicle location of the vehicle is associated with autonomous operation of the vehicle without an observer; and controlling the vehicle in the autonomous mode without a connection with a remote computing device configured to provide control signals.

15. The method of claim 6, wherein the computing device is a first computing device and the control signal is a first control signal, the method further comprising:

establishing a first connection with the first computing device at a first time prior to a second time associated with receiving the first control signal;

establishing, at a third time after the second time, a second connection with a second computing device associated with a second operator located in the environment and remote to the vehicle, wherein the second connection enables receipt of one or more control signals from the second computing device; and determining, based at least in part on the second connection, to disconnect the first connection with the first computing device.

16. The method of claim 6, wherein the control signal is received by a primary controller of a vehicle computing system associated with the vehicle, the primary controller being independent of a planner component of the vehicle computing system.

17. A system comprising:

one or more processors;

one or more computer-readable media storing instructions that, when executed by the one or more processors, cause the system to:

receive, from a computing device, a control signal comprising a constraint associated with limiting operation of a vehicle operating in an autonomous mode in an environment, wherein the computing device is associated with an operator located in the environment in proximity to the vehicle;

control the vehicle based at least in part on the constraint;

determine that a condition associated with the constraint is satisfied; and control the vehicle in the autonomous mode based at least in part on the condition being satisfied.

18. The system of claim 17, wherein the instructions further cause the system to:

determine that the constraint is associated with a guidance system located remote from the environment and configured to provide operational guidance to the vehicle;

send, to a second computing device associated with the guidance system, a guidance request comprising sensor data representative of the environment; and receive, from the second computing device, a release signal comprising an instruction to remove the constraint, wherein the release signal is based at least in part on the sensor data, wherein determining that the condition associated with the constraint is satisfied is based at least in part on receiving the release signal.

19. The system of claim 17, wherein the constraint comprises a limitation on continued movement of the vehicle and the instructions further cause the system to:

determine a deceleration associated with stopping the vehicle; and determine, based at least in part on a determination that the vehicle has stopped movement, that the condition associated with the constraint is satisfied.

20. The system of claim 17, wherein the control signal is received at a first time and the instructions further cause the system to:

receive, from the computing device at a second time prior to the first time, a connection request comprising an identifier associated with the computing device; and establish a connection with the computing device based at least in part on a validation of the identifier, wherein the control signal is received via the connection.

* * * * *